US011512783B2

(12) United States Patent
Vijay

(10) Patent No.: US 11,512,783 B2
(45) Date of Patent: Nov. 29, 2022

(54) VALVE ASSEMBLIES AND ASSOCIATED COMPONENTS

(71) Applicant: Hydril USA Distribution LLC, Houston, TX (US)

(72) Inventor: Chatufale Vijay, Missouri City, TX (US)

(73) Assignee: Hydril USA Distribution LLC, Houston, TX (US)

( * ) Notice: Subject to any disclaimer, the term of this patent is extended or adjusted under 35 U.S.C. 154(b) by 0 days.

(21) Appl. No.: 17/040,051

(22) PCT Filed: Jan. 25, 2019

(86) PCT No.: PCT/NO2019/050018
§ 371 (c)(1),
(2) Date: Sep. 22, 2020

(87) PCT Pub. No.: WO2019/190328
PCT Pub. Date: Oct. 3, 2019

(65) Prior Publication Data
US 2021/0025505 A1    Jan. 28, 2021

Related U.S. Application Data

(60) Provisional application No. 62/649,584, filed on Mar. 29, 2018.

(51) Int. Cl.
*F16K 3/02*    (2006.01)
*F16K 37/00*   (2006.01)
(Continued)

(52) U.S. Cl.
CPC .......... *F16K 3/0227* (2013.01); *F16K 3/0254* (2013.01); *F16K 3/312* (2013.01);
(Continued)

(58) Field of Classification Search
CPC .......... F16K 27/044; F16K 3/02; F16K 3/316; F16K 3/0227; F16K 3/0236;
(Continued)

(56) References Cited

U.S. PATENT DOCUMENTS 2,660,191 A * 11/1953 Volpin .................... F16K 27/08
                                                          104/32.1
3,696,831 A   10/1972 Fowler et al.
(Continued)

FOREIGN PATENT DOCUMENTS

CN    102943886 A    2/2013
CN    205715726 U    11/2016
(Continued)

*Primary Examiner* — Atif H Chaudry
(74) *Attorney, Agent, or Firm* — Osha Bergman Watanabe & Burton LLP

(57) ABSTRACT

A gate valve for controlling a flow of a fluid. The gate valve includes a valve body with a first seat pocket and a flow bore, a gate which is movable so as to intersect the flow bore, a seat with a gate end and a body end, a plate with an opening which is positionable on the seat at the gate end, and a plate retainer which is positionable between the seat and the plate so as to prevent an axial movement between the seat and the plate with respect to an axis of the flow bore. The flow bore extends through the valve body for the flow of the fluid. The gate end is arranged to face the gate, and the body end is positionable within the first seat pocket of the valve body.

17 Claims, 16 Drawing Sheets

(51) Int. Cl.
*F16K 3/316* (2006.01)
*F16K 3/312* (2006.01)
*F16K 25/00* (2006.01)

(52) U.S. Cl.
CPC ............ *F16K 3/316* (2013.01); *F16K 25/005* (2013.01); *F16K 37/0008* (2013.01); *Y10T 137/0514* (2015.04)

(58) Field of Classification Search
CPC ...... F16K 3/0263; F16K 25/005; F16K 3/312; Y10T 137/0514
See application file for complete search history.

(56) References Cited

U.S. PATENT DOCUMENTS

| | | | |
|---|---|---|---|
| 3,933,338 A | 1/1976 | Herd et al. | |
| 3,958,592 A | 5/1976 | Wells et al. | |
| 4,213,480 A | 7/1980 | Orum et al. | |
| 4,340,204 A | 7/1982 | Herd | |
| 4,406,303 A | 9/1983 | Kilmoyer | |
| 4,486,185 A * | 12/1984 | Cataldo | F16G 5/18 |
| | | | 474/201 |
| 4,744,386 A | 5/1988 | Frazer | |
| 5,020,568 A | 6/1991 | Taylor | |
| 5,094,270 A | 3/1992 | Reimert | |
| 5,215,286 A | 6/1993 | Kolenc | |
| 5,377,955 A * | 1/1995 | Baker | F16K 3/0263 |
| | | | 251/327 |
| 5,762,320 A | 6/1998 | Williams et al. | |
| 6,041,804 A | 3/2000 | Chatufale | |
| 6,487,960 B1 | 12/2002 | Chatufale | |
| 6,659,419 B2 | 12/2003 | Chatufale | |
| 6,664,572 B2 | 12/2003 | Chatufale | |
| 8,973,897 B2 | 3/2015 | Cordova et al. | |
| 2003/0116732 A1 | 6/2003 | Chatufale | |
| 2005/0005966 A1 | 1/2005 | Biester | |
| 2013/0248001 A1 | 9/2013 | Young | |
| 2013/0277589 A1 | 10/2013 | Vaughan | |
| 2014/0174554 A1 | 6/2014 | Meyberg et al. | |
| 2014/0326338 A1 | 11/2014 | Cook et al. | |
| 2015/0060715 A1* | 3/2015 | Hoang | F16K 3/0263 |
| | | | 251/328 |
| 2016/0115810 A1* | 4/2016 | Davis | F16J 15/3452 |
| | | | 277/592 |
| 2016/0245425 A1 | 8/2016 | Heyn | |
| 2017/0191570 A1 | 7/2017 | Roberts | |
| 2018/0010697 A1* | 1/2018 | Parks, Jr. | F16K 25/04 |
| 2018/0066767 A1 | 3/2018 | Nesloney | |

FOREIGN PATENT DOCUMENTS

| | | |
|---|---|---|
| GB | 2 313 429 A | 11/1997 |
| GB | 2 397 085 A | 7/2004 |
| GB | 2485197 A | 5/2012 |
| WO | WO 2016/200864 A1 | 12/2016 |

* cited by examiner

VALVE ASSEMBLIES AND ASSOCIATED COMPONENTS

CROSS REFERENCE TO PRIOR APPLICATIONS

This application is a U.S. National Phase application under 35 U.S.C. § 371 of International Application No. PCT/NO2019/050018, filed on Jan. 25, 2019 and which claims benefit to U.S. Provisional Patent Application No. 62/649,584, filed on Mar. 29, 2018. The International Application was published in English on Oct. 3, 2019 as WO 2019/190328 A1 under PCT Article 21(2).

FIELD

The present invention relates to valves, valve assemblies, and components suitable for use in valve assemblies.

BACKGROUND

This section is intended to provide relevant contextual information to facilitate a better understanding of the various aspects of the described embodiments. It should accordingly be understood that these statements are to be read in this light, and not as admissions of prior art.

Various types of valves are used in oilfield well exploration, drilling, and production equipment. Valves are coupled to a pipeline and are typically used to shut off or turn on the flow of a fluid, such as a liquid, gas or both. Valves are typically either unidirectional or bi-directional. In a unidirectional valve, the valve must be placed only in one unique way in a pipeline so as to match the pressure and flow direction. In a bi-directional valve, either side of the valve can be used as the upstream side, which allows the valve to be placed in a pipeline without any specific side facing the direction of pressure and flow. Valve sealing components are usually symmetrical for ease of installation and maintenance and to achieve bi-directionality.

A gate valve is a type of valve that includes a substantially rectangular-shaped gate that is moved by an operator in and out of the valve body to control the fluid. The gate includes a bore or opening that is movable into and out of alignment with a flow bore of the valve body to allow or shut off fluid flow through the gate valve. The operator may be manual or may include an actuator which is, for example, powered hydraulically, pneumatically, or electrically. A gate valve typically also includes an annular or ring-shaped seat or seat member that seals against the gate. Depending on gate valve design, one seat member may be located on either side of the gate, or alternatively, additional seat members may be located adjacent the seat member, which members are involved in the sealing of the valve. The additional seat members seal the passage between the seat member and body pocket.

A pocket formed within the valve body houses the seal assembly. A valve seal assembly includes sealing members, such as the seat member, adjacent the valve engaging member, and other associated seat members which may be referred to as a body bushing or pocket insert, as examples. A seal assembly also includes a seal ring, which provides a seal between the various seat members, the pocket, and the gate.

SUMMARY

In an embodiment, the present invention provides a gate valve for controlling a flow of a fluid. The gate valve includes a valve body which comprises a first seat pocket and a flow bore, the flow bore being configured to extend through the valve body for the flow of the fluid, a gate which is configured to be movable so as to intersect the flow bore, a seat which comprises a gate end and a body end, the gate end being arranged to face the gate, and the body end being positionable within the first seat pocket of the valve body, a plate which comprises an opening which is positionable on the seat at the gate end, and a plate retainer which is positionable between the seat and the plate so as to prevent an axial movement between the seat and the plate with respect to an axis of the flow bore.

Embodiments relating to the present disclosure relate to gate valves for controlling flow of a fluid, gate valve assemblies, hydraulic actuators for moving a gate within a gate valve; connectors for coupling an actuator with a gate valve, and indicator barriers for indicating a position of a gate within a valve.

BRIEF DESCRIPTION OF THE DRAWINGS

Illustrative embodiments of the present disclosure are described in detail below with reference to the attached drawings, which are incorporated by reference herein, wherein.

The illustrated drawings are only exemplary and are not intended to assert or imply any limitation with regard to the environment, architecture, design, or process in which different embodiments may be implemented.

DETAILED DESCRIPTION

The present disclosure generally relates to a gate valve for permitting or preventing the flow of a fluid, and associated components suitable for use together with such a gate valve, and/or in valve assemblies comprising one or more gate valves.

In one aspect, the disclosure provides a gate valve that includes a seat, a plate, and a plate retainer to retain the position of the plate on the seat and prevent movement (e.g., axially and/or rotationally) between the plate and the seat. The disclosure also provides a gate valve that includes a valve body, a seat, and a seat retainer to retain the position of the seat in the valve body and prevent movement (e.g., axially and/or rotationally) between the seat and the valve body.

Figure 1:
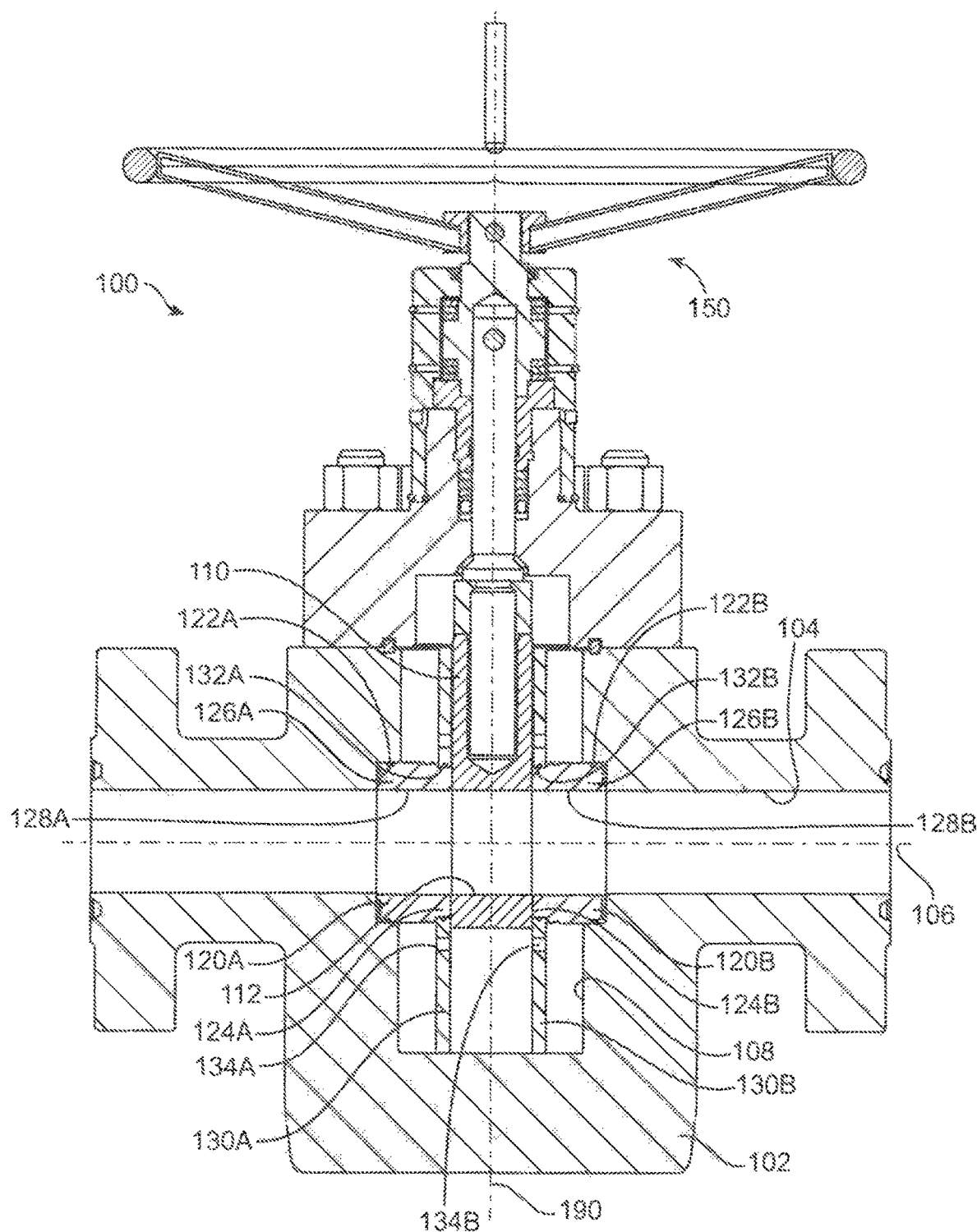
FIG. 1 shows a cross-sectional view of a gate valve in accordance with one or more embodiments of the present disclosure.
Figure 2:
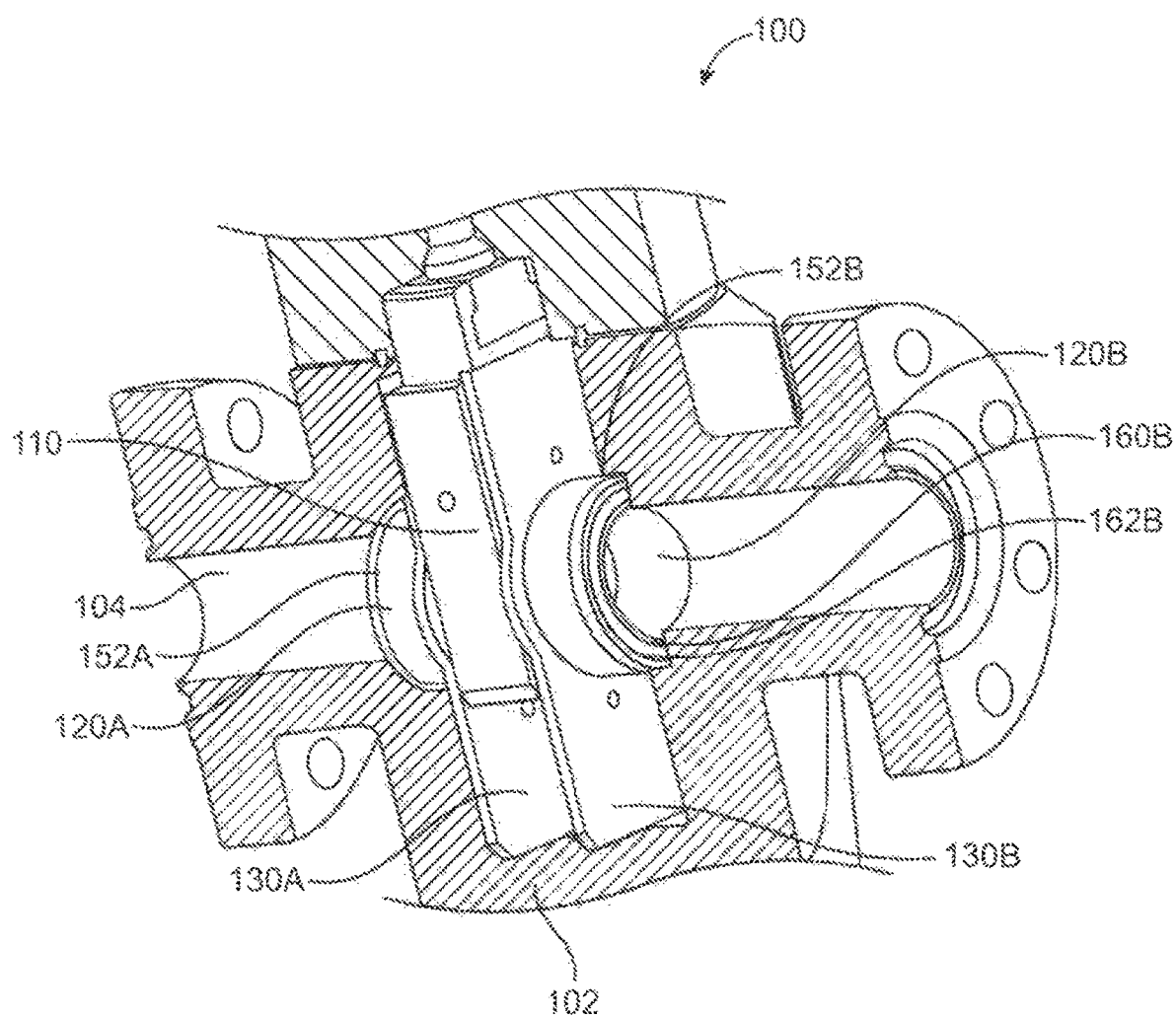
FIG. 2 shows a perspective sectional view of a gate valve in accordance with one or more embodiments of the present disclosure.
Figure 3:
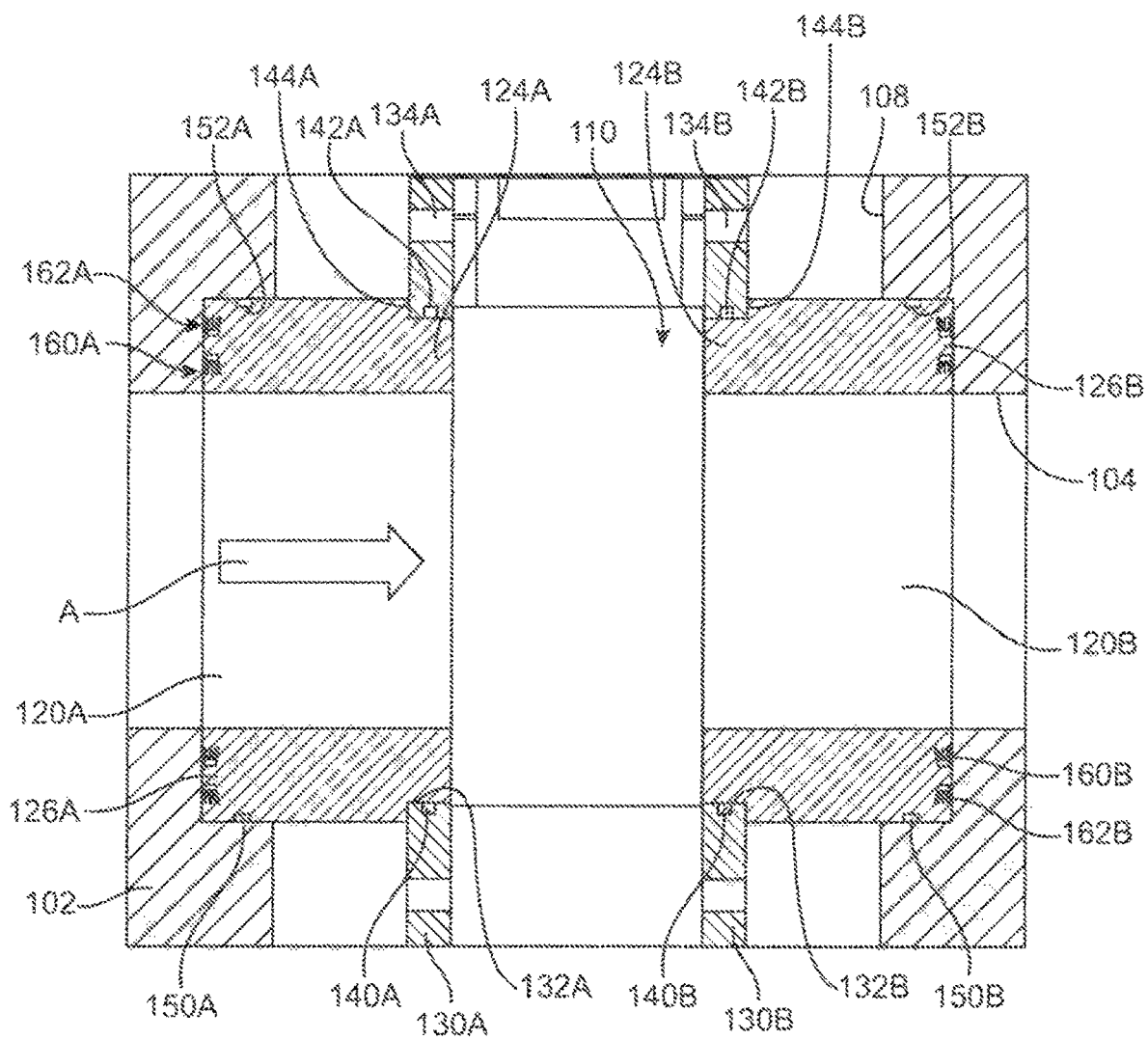
FIG. 3 shows a cross-sectional view of a gate valve in accordance with one or more embodiments of the present disclosure.

Referring now to FIGS. 1-3 collectively, multiple views of a gate valve 100 in accordance with one or more embodiments of the present disclosure are shown. FIG. 1 shows a cross-sectional view of the gate valve 100, FIG. 2 shows a perspective and enlarged sectional view of the gate valve 100, and FIG. 3 shows an enlarged cross-sectional view of the gate valve 100.

The gate valve 100 includes a valve body 102 with a flow bore 104 formed through the valve body 102 for fluid flow along an axis 106. The arrow A in FIG. 3 along the axis 106 generally indicates the direction of fluid flow within the flow bore 104, but the gate valve 100 is not so limited, as fluid may also flow in the opposite direction of arrow A, as the gate valve 100 may be used for bi-directional fluid flow. The valve body 102 also includes a cavity 108 formed therein that intersects the flow bore 104 for receiving one or more components of the gate valve 100 within the body 102 as is explained below.

The gate valve 100 includes a gate 110 which is movable with respect to the valve body 102 and within the cavity 108 to intersect the flow bore 104 between seats 120A, 120B. The gate 110 in particular includes a bore 112 formed therethrough so that, in an open position (as shown), the gate valve 100 permits fluid flow through the flow bore 104 with the bore 112 of the gate 110, and in a closed position, prevents or restricts fluid flow through the flow bore 104 by not having the bore 112 aligned with the flow bore 104. A gate actuator 150 coupled to the gate 110 may be used to move the gate 110 along an axis 190 positioned perpendicular to the axis 106 of the flow bore 4 to open and close the gate valve 100. The gate actuator 150 may be a manual actuator, as shown, which is operated by a user through a hand wheel. The gate actuator 150 may alternatively be a hydraulic, pneumatic, or electrical actuator to move the gate 110.

The gate valve 100 includes seats 120A, 120B that may generally be defined as an upstream seat 120A and a downstream seat 120B. In general, the seats 120A, 120B, in addition to other components, may be identified and described as "upstream" or "downstream" based upon the flow of fluid through the flow bore 104. However, the present disclosure is not so limited, as a previous "upstream" component may be a "downstream" component and vice-versa should the direction of the flow of fluid through the flow bore 104 change.

The valve body 102 includes an upstream seat pocket 122A formed therein for the upstream seat 120A to be received or positioned within the upstream seat pocket 122A. The upstream seat 120A in particular has a gate end 124A and a body end 126A so that the body end 126A of the upstream seat 120A is positioned within the upstream seat pocket 122A with the gate end 124A facing the gate 110. The valve body 102 similarly includes a downstream seat pocket 122B formed therein for the downstream seat 120B to be received or positioned within the downstream seat pocket 122B. The downstream seat 120B in particular has a gate end 124B and a body end 126B so that the body end 126B of the downstream seat 120B is positioned within the downstream seat pocket 122B with the gate end 124B facing the gate 110. The gate ends 124A, 124B of the seats 120A, 120B, respectively, face each other to engage the gate 110, and the body ends 126A, 126B of the seats 120A, 120B, respectively, oppose each other with each forming a seal against the valve body 102. The seats 120A, 120B each further include bores 128A, 128B, respectively, that may have the same diameter as the flow bore 104 for enabling fluid flow through the seats 120A, 120B and the flow bore 104.

The gate valve 100 further includes plates 130A, 130B, which may be referred to as debris plates, that are positioned over or about the seats 120A, 120B, respectively. The plates 130A, 130B in particular each include an opening 132A, 132B, respectively, so that the opening 132A of the upstream plate 130A is receivable or positionable over the gate end 124A of the upstream seat 120A and the opening 132B of the downstream plate 130B is receivable or positionable over the gate end 124B of the downstream seat 120B.

The plates 130A, 130B are positioned on opposite sides of the gate 110 with respect to each other and may be used to protect the gate 110 and/or other components of the gate valve 100. The plates 130A, 130B may, for example, be used to prevent debris from impinging or accumulating upon gate 110, or may be used to remove or wipe off debris that does accumulate upon the gate 110 when the gate 110 moves between and with respect to the plates 130A, 130B. The plates 130A, 130B may be positioned over the seats 120A, 120B, respectively, so that the plates 130A, 130B are supported (e.g., fully supported) by the seats 120A, 120B. The plates 130A, 130B may, for example, be suspended within the cavity 108 from the seats 120A, 120B, or otherwise only rely on support from and not engage any other component other than the seats 120A, 120B. The plates 130A, 130B may further include one or more apertures 134A, 134B formed therethrough, so as to enable fluid pressure equalization across the plates 130A, 130B.

In one or more embodiments, as best shown in FIG. 3, one or more plate retainers 140A, 140B may be used to retain the position of the plates 130A, 130B on the seats 120A, 120B, respectively, and prevent movement (e.g., axially and/or rotationally) between the plates 130A, 130B and the seats 120A, 120B. The plate retainer 140A may, for example, be positioned between the upstream plate 130A and the upstream seat 120A to prevent movement of the upstream plate 130A with respect to the upstream seat 120A. The plate retainer 140A may prevent axial movement between the upstream plate 130A and the upstream seat 120A with respect to the axis 106 of the flow bore 104. The plate retainer 140A may additionally or alternatively prevent rotational movement between the upstream plate 130A and the upstream seat 120A about the axis 106 of the flow bore 104.

The plate retainer 140B may similarly be positioned between the downstream plate 130B and the downstream seat 120B to prevent movement of the downstream plate 130B with respect to the downstream seat 120B. The plate retainer 140B may prevent axial movement between the downstream plate 130B and the downstream seat 120B with respect to the axis 106 of the flow bore 104. The plate retainer 140B may additionally or alternatively prevent rotational movement between the downstream plate 130B and the downstream seat 120B about the axis 106 of the flow bore 104.

To position the plate retainers 140A, 140B between the plates 130A, 130B and the seats 120A, 120B, the plates 130A, 130B and/or the seats 120A, 120B may have a groove formed therein to receive the plate retainers 140A, 140B. For example, the upstream plate 130A may have a groove 142A, such as formed within the opening 132A of the upstream plate 130A, with the plate retainer 140A positioned within the groove 142A, and the downstream plate 130B may have a groove 142B, such as formed within the opening 132B of the downstream plate 130B, with the plate retainer 140B positioned within the groove 142B. A plate retainer in accordance with the present disclosure may include, for example, a wave spring, or may alternatively include a different component such as a seal (e.g., an oversized o-ring) or a pin. Other embodiments and arrangements are thus contemplated for a plate retainer and the position of a plate retainer without departing from the scope of the present disclosure.

As shown, the seats 120A, 120B may include a step 144A, 144B or a recess formed therein to facilitate maintaining the position of the plates 130A, 130B with respect to the 120A, 120B, respectively. The upstream seat 120A may, for example, include a step 144A formed on the gate end 124A of the upstream seat 120A so that the gate end 124A has a smaller diameter than body end 126A. The upstream plate 130A is positioned (e.g., fully positioned) within, around, or about the step 144A with the plate retainer 140A engaging the step 144A. Similarly, the downstream seat 120B may, for example, include a step 144B formed on the gate end 124B of the downstream seat 120B so that the gate end 124B has a smaller diameter than body end 126B. The downstream plate 130B is positioned within, on, or about the step 144B with the plate retainer 140B engaging the step 144B. The seats 120A, 120B may each further include a tapered or beveled edge formed on the gate ends 124A, 124B, respectively, to facilitate positioning the plates 130A, 130B within the steps 144A, 144B.

In one or more embodiments, as best shown in FIG. 3, one or more seat retainers 150A, 150B may be used to retain the position of the seats 120A, 120B within the seat pockets 122A, 122B, respectively. The seat retainers 150A, 150B are engaged with the valve body 102 and the seats 120A, 120B, respectively, to prevent movement (e.g., axially and/or rotationally) between of the seats 120A, 120B and the valve body 102. The seat retainer 150A may, for example, be positioned between the upstream seat 120A and the seat pocket 122A of the valve body 102 to increase the friction between the upstream seat 120A and the valve body 102 and prevent movement therebetween. The seat retainer 150A may prevent rotational movement between the upstream seat 120A and the seat pocket 122A of the valve body 102 about the axis 106 of the flow bore 104. The seat retainer 150A may additionally or alternatively prevent axial movement between the upstream seat 120A and the seat pocket 122A of the valve body 102 with respect to the axis 106 of the flow bore 104.

The seat retainer 150B may similarly be positioned between the downstream seat 120B and the seat pocket 122B of the valve body 102 to increase friction between the downstream seat 120B and the valve body 102 and to prevent movement therebetween. The seat retainer 150B may prevent rotational movement between the downstream seat 120B and the seat pocket 122B of the valve body 102 about the axis 106 of the flow bore 104. The seat retainer 150B may additionally or alternatively prevent axial movement between the downstream seat 120B and the seat pocket 122B of the valve body 102 with respect to the axis 106 of the flow bore 104.

To position the seat retainers 150A, 150B between the seats 120A, 120B and the seat pockets 122A, 122B of the valve body 102, the seats 120A, 120B and/or the seat pockets 122A, 122B include a groove formed therein to receive the seat retainers 150A, 150B. For example, as shown, the upstream seat 120A has a groove 152A formed on an outer cylindrical surface of the body end 126A with the seat retainer 150A positioned within the groove 152A, and the downstream seat 120B has a groove 152B formed on an outer cylindrical surface of the body end 126B with the seat retainer 150B positioned within the groove 152B. As with the plate retainer, a seat retainer in accordance with the present disclosure may include, for example, a wave spring, or may alternatively include a different component such as a seal (e.g., an oversized o-ring) or a pin. Other embodiments and arrangements are thus contemplated for a plate retainer and the position of a plate retainer without departing from the scope of the present disclosure.

One or more seals are formed or positioned between the seats 120A, 120B and the valve body 102 to facilitate sealing within the gate valve 100. As shown best in FIG. 3, inner diameter seals 160A, 160B and outer diameter seals 162A, 162B may, for example, be positioned between the seat pockets 122A, 122B of the seats 120A, 120B, respectively. For the upstream seat 120A, the inner diameter seal 160A and the outer diameter seal 162A are positioned within annular recesses of the upstream seat 120A between a planar surface of the body end 126A and the seat pocket 122A. The inner diameter seal 160A is positioned within the outer diameter seal 162A with the outer diameter seal 162A spaced apart from an outer cylindrical surface or edge of the seat 120A. For the downstream seat 120B, the inner diameter seal 160B and the outer diameter seal 162B are positioned within annular recesses of the downstream seat 120B between a planar surface of the body end 126B and the seat pocket 122B. The inner diameter seal 160B is positioned within the outer diameter seal 162B with the outer diameter seal 162B spaced apart from an outer cylindrical surface or edge of the seat 120B.

As shown, the seals 160A, 160B, 162A, 162B may be one-way seals, in which the inner diameter seals 160A, 160B and the outer diameter seals 162A, 162B may face and seal in opposite directions with respect to each other. In such an embodiment, the seals 160A, 160B, 162A, 162B may be compressed when inserted between the respective seats 120A, 120B and the valve body 102, in which the seals 160A, 160B, 162A, 162B prevent fluid pressure from moving across the seal in one-direction, but allow fluid pressure across the seal in the other direction. The present disclosure is not, however, so limited, as the seals 160A, 160B, 162A, 162B may include elastomer seals, O-ring seals, annular seals, any other suitable sealing device, or combinations thereof. To facilitate sealing and prevent leakage across the seats 120A, 120B, the seats 120A, 120B may further be formed as a single piece monolithic structure, as shown in FIGS. 1-3.

Figure 4:
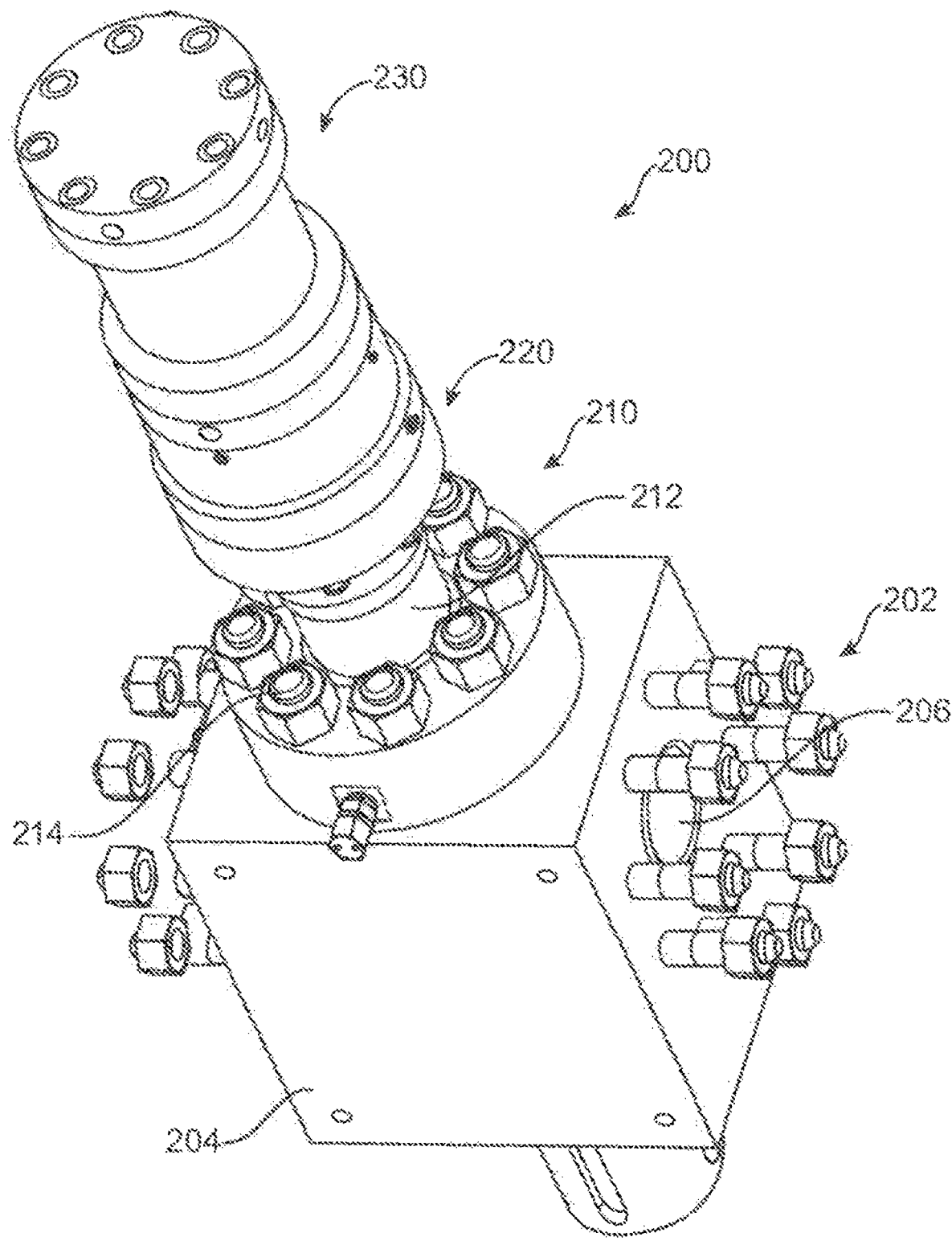
FIG. 4 shows a perspective view of a gate valve assembly in accordance with one or more embodiments of the present disclosure.

Referring now to FIGS. 4-8, a self-contained hydraulic actuator for a valve is disclosed. FIG. 4 shows a perspective view of a gate valve assembly 200 in accordance with one or more embodiments of the present disclosure. The gate valve assembly 200 includes a gate valve 202 with a valve body 204 including a flow bore 206 formed through the valve body 204 for fluid flow. A gate (shown and discussed in greater detail below) is included within and is movable with respect to the valve body 204 to selectively interest the flow bore 206 to enable or prevent fluid flow through the flow bore 206.

The gate valve assembly 200 further includes a bonnet 210 coupled to the gate valve 202. The bonnet 210 includes a bonnet housing 212 coupled to the valve body 204 using one or more fasteners 214 (e.g., bolts or screws) with a stem (shown and discussed in greater detail below) positioned within and movable with respect to the bonnet housing 212 along an axis. The stem is coupled to the gate to move the gate within the gate valve 202. The bonnet 210 may serve as a cover to the valve body 204, with the bonnet 210 coupled to the valve body 204 (e.g., semi-permanently) once the internal parts to the gate valve 202 are positioned within the valve body 204. To access the internal parts to the gate valve 202, the bonnet 210 may be removed or decoupled from the valve body 204.

The gate valve assembly 200 further includes an actuator 230, such as a hydraulic actuator and/or a double-acting actuator, that may be coupled to the bonnet 210. The actuator 230 may in particular be coupled to the bonnet 210 and/or to the valve 202 at any orientation with respect to the axis of the stem. A connector 220 is included within the gate valve assembly 200 to couple the actuator 230 and the bonnet 210 to each other. The connector 220 facilitates assembling the gate valve assembly 200, as ports for the actuator 230 may then be located at any rotational orientation with respect to the bonnet 210 and/or the valve 202.

Figure 5:
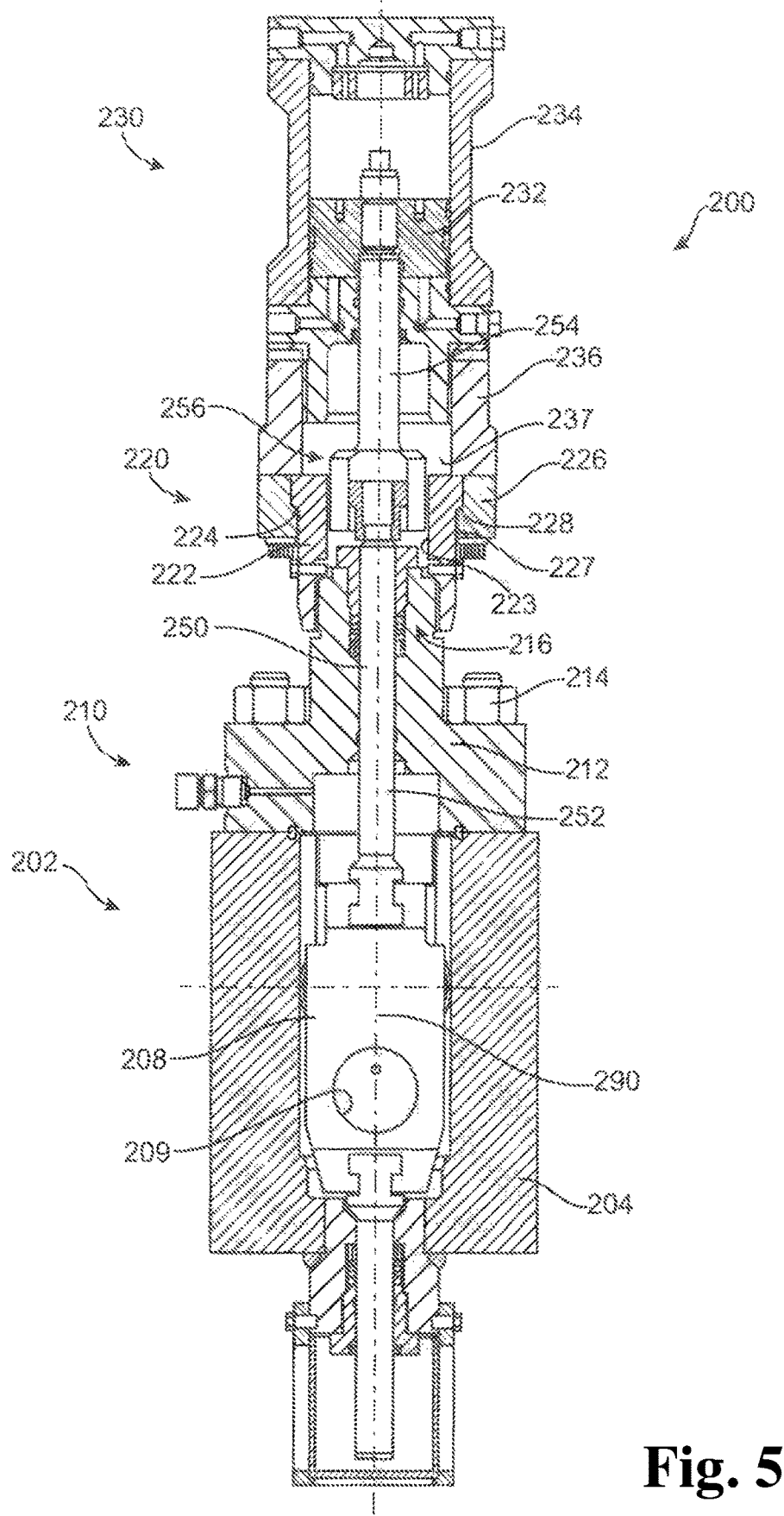
FIG. 5 shows a cross-sectional view of a gate valve assembly in accordance with one or more embodiments of the present disclosure.

Referring now to FIG. 5, a cross-sectional view of the gate valve assembly 200 in accordance with one or more embodiments of the present disclosure is shown. The gate valve assembly 200 includes the gate valve 202, the bonnet 210, the connector 220, and the actuator 230. A gate 208 with a bore 209 formed through the gate 208 is movably positioned within the valve body 204. The actuator 230 includes a piston 232 positioned and movable within an actuator housing 234. A stem 250 is coupled between the piston 232 and the gate 204 so that the piston 232 is able to move the gate 208 within the valve body 204 to intersect the flow bore 206 and selectively open and close the gate valve 202. The stem 250 thus moves within the gate valve assembly 200 along an axis 290 to move the gate 208.

The stem 250 may include two or more portions coupled with each other. For example, as shown, the stem 250 includes an operating stem 252 and an actuator stem 254. The operating stem 252 is positioned and movable within the bonnet housing 212 with the operating stem 252 coupled (e.g., directly) to the gate 208. A stem seal assembly 216 is shown coupled about the operating stem 252 and with the bonnet housing 212 to effect a seal between the stem 250 and the bonnet 210. The actuator stem 254 is positioned and movable within the actuator housing 234 with the actuator stem 254 coupled (e.g., directly) to the piston 232. The operating stem 252 and the actuator stem 254 are then coupled to each other through a releasable coupling 256. The releasable coupling 256 may be a non-threaded coupling, which may include a key-and-groove type coupling, such as a t-slot coupling shown in FIG. 5. The coupling between the operating stem 252 and the gate 208 may be similar, such as a releasable non-threaded coupling, shown particularly as a t-slot coupling.

Figure 6:
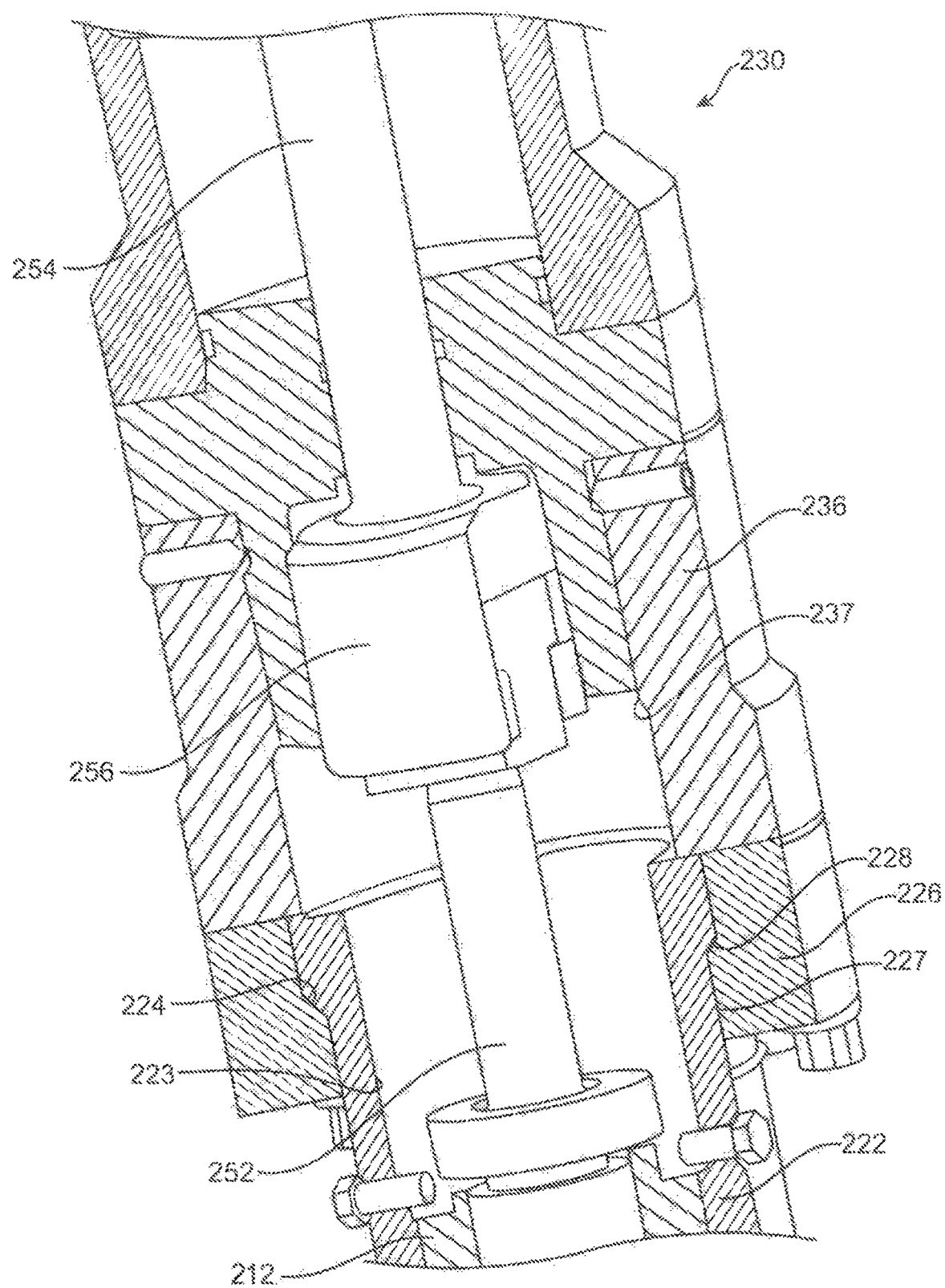
FIG. 6 shows a perspective sectional view of a connector of a gate valve assembly in accordance with one or more embodiments of the present disclosure.
Figure 7:
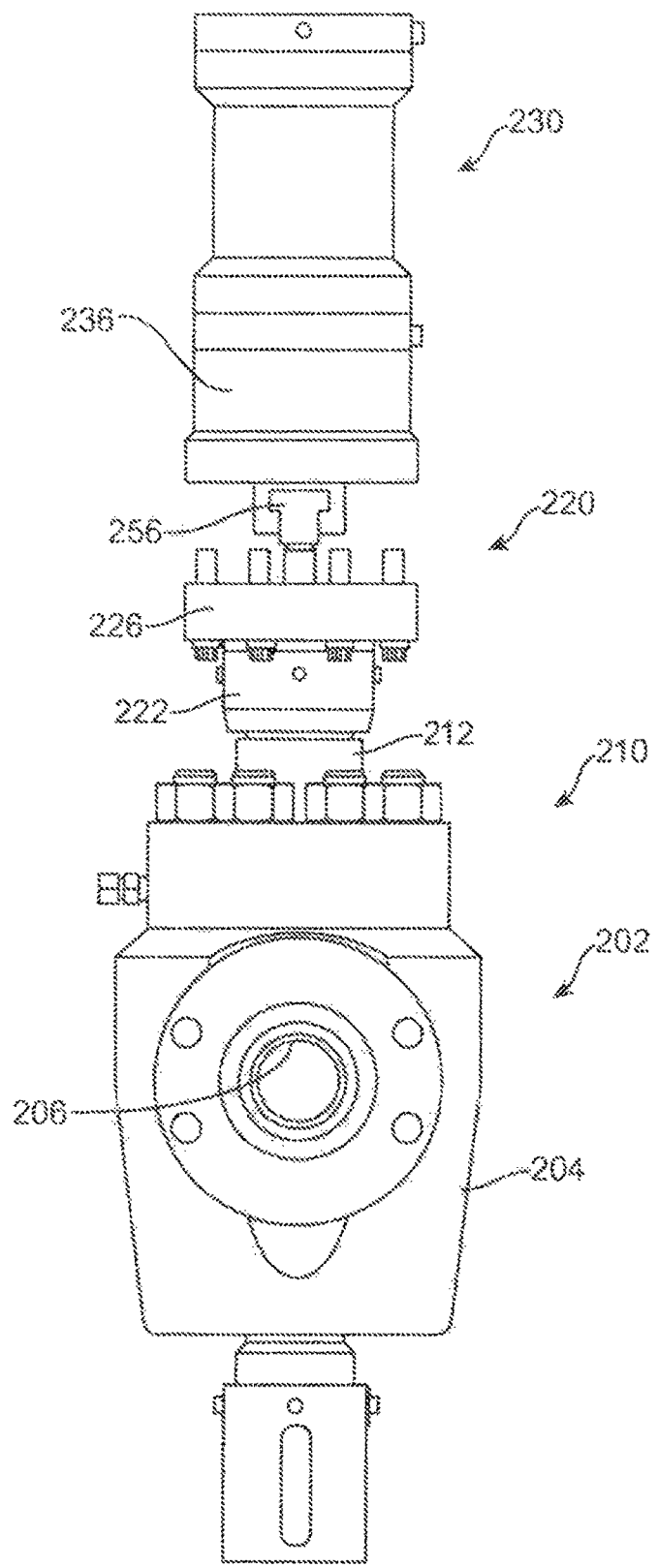
FIG. 7 shows a perspective view of a gate valve assembly in accordance with one or more embodiments of the present disclosure.

As discussed above, the actuator 230 is coupleable to the bonnet 210 and/or the gate valve 202 at any orientation with respect to the axis 290 of the stem 250. To facilitate this feature, the connector 220 is used to couple the actuator 230 to the bonnet 210. Referring now to FIGS. 5-7, the connector 220 includes a connector spool 222 and a connector cap 226 engaged with each other. The connector spool 222 is connected (e.g., directly through a threaded or bolted connection) to the bonnet housing 212, and the connector cap 226 is connected (e.g., directly with fasteners 229) to the actuator 230, and more particularly to an actuator spool 236 of the actuator 230. The connector spool 222 includes a bore 223 therethrough and an annular outer shoulder 224 on an outer surface. The connector cap 226 includes a bore 227 formed therethrough and an annular inner shoulder 228 formed on an inner surface. The outer diameter of the connector spool 222 is larger than the inner diameter of the connector cap 226 so that the outer shoulder 224 engages the inner shoulder 228. When connecting the connector cap 226 to the actuator spool 236 (e.g., using fasteners 229 in this embodiment), the connector cap 226 will in particular move axially with respect to the connector spool 222 to bring the shoulders 224, 228 into engagement. This engagement clamps or sandwiches the outer shoulder 224 of the connector spool 222 between the inner shoulder 228 of the connector cap 226 and the actuator spool 236 to secure the actuator 230 to the bonnet 210.

By including shoulders 224, 228 of the connector spool 222 and the connector cap 226 in engagement with each other, the connector 220 may be used to couple the actuator 230 to the bonnet 210 at any rotational orientation about the axis 290 with respect to each other. For example, if using fasteners (e.g., bolts) or threads to attach the actuator 230 to the bonnet 210, the actuator 230 and the bonnet 210 must be aligned at predetermined rotational orientations with respect to each other, either at the predetermined fastener arrangements or until the threads bottom out and fully engage each other. With the connector 220, the connector spool 222, connected to the bonnet 210, and the connector cap 226, connected to the actuator 230, may be oriented at any angle with respect to each other about the axis 290 with the shoulders 224, 228 still capable of engaging each other. This enables the gate valve 202 and the bonnet 210 to be oriented at any angle with respect to the actuator 230 about the axis 290.

Referring still to FIGS. 5-7, the releasable coupling 256 between the operating stem 252 and the actuator stem 254 is positionable, at least partially, within the bore 223 of the connector spool 222, the bore 227 of the connector cap 226, and/or a bore 237 of the actuator spool 236. For example, the releasable coupling 256 (along with the gate 208, the piston 232, and the stems 252, 254) is movable between an upper position (shown in FIG. 6) and a lower position (shown in FIG. 5), the releasable coupling 256 may be positioned within the bore 237 of the actuator spool 236 in the upper position, or may be positioned within the bore 223 of the connector spool 222 and the bore 227 of the connector cap 226 in the lower position.

By having the releasable coupling 256 so positioned, the gate valve 202 and the bonnet 210 may be decoupled or disconnected from each other at the releasable coupling 256 with the gate valve 202 and the bonnet 210 still coupled to each other, the gate valve 202 still assembled (e.g., not having to be depressurized), and the actuator 230 still assembled (e.g., not having to be opened to expose the hydraulic fluid). For example, FIG. 7 shows the connector 220 in a disassembled state so that the connector cap 226 is not connected to and is lowered with respect to the actuator housing 236. This exposes and enables the releasable coupling 256 to be accessible. The actuator 230 may thereby be decoupled from the gate valve 202 and the bonnet 210 at the releasable coupling 256 with the actuator 230 still assembled. This facilitates removing and replacing the actuator 230, and also prevents any covers on the actuator 230 from being removed so that any hydraulic fluid within the actuator 230 may be contaminated or needs to be removed. This further enables the bonnet 210 and the gate valve 202 to remain coupled to each other to prevent contamination within the gate valve 202.

Figure 8:
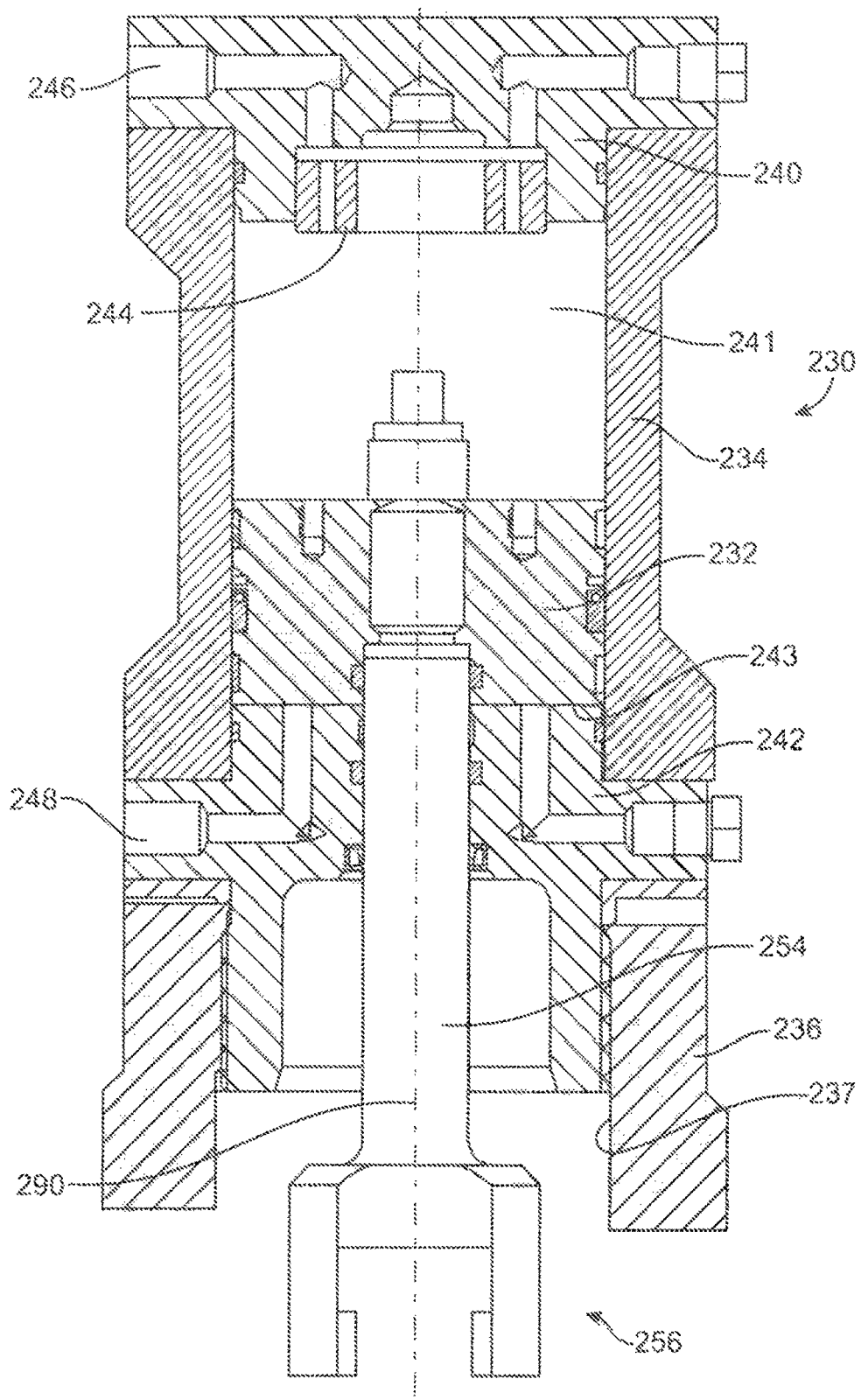
FIG. 8 shows a cross-sectional view of an actuator of a gate valve assembly in accordance with one or more embodiments of the present disclosure.

Referring now to FIG. 8, a cross-sectional view of the actuator 230 in accordance with one or more embodiments of the present disclosure is shown. The actuator 230 includes the actuator housing 234 with an upper cover 240 (e.g., cap or head) and a lower cover 242 coupled to opposite ends of the actuator housing 234. The piston 232 is movable within the actuator housing 234 to partially define an upper chamber 241 within the actuator housing 234 between the piston 232 and the upper cover 240 and a lower chamber 243 within the actuator housing 234 between the piston 232 and the lower cover 242. The actuator spool 236 of the actuator 230 is coupled to the lower cover 242, such as through threaded engagement in this embodiment. The actuator stem 254 coupled to the piston 232 further extends through the lower cover 242, as shown, to have a portion of the releasable coupling 256 positioned within the bore 237 of the actuator spool 236.

In one or more embodiments, an adjustment mechanism 244 may be included with the actuator 230 to adjust the movement of the end positions of the movement of the piston 232 within the actuator 230. For example, the adjustment mechanism 244 is shown as positioned within the upper chamber 241 of the actuator housing 234 to be able to adjust the upper position of the piston 232 within the actuator housing 234. In this embodiment, the adjustment mechanism 244 is shown as a drift ring that is directly coupled to the upper cover 240. The adjustment mechanism 244 may be moved relative to the upper cover 240 with respect to the axis 290 to adjust an end stop position for the piston 232 to abut the adjustment mechanism 244. As the adjustment mechanism 244 is a drift ring in this embodiment threadedly engaged with the upper cover 240, the adjustment mechanism 244 may, for example, be rotated with respect to the upper cover 240 to adjust and move the adjustment mechanism 244 axially with respect to the upper cover 240 and adjust the upper position limit of the piston 232 within the actuator housing 234.

Referring still to FIG. 8, the upper cover 240 may include one or more upper chamber ports 246 to enable fluid communication with the upper chamber 241, and/or the lower cover 242 may include one or more lower chamber ports 248 to enable fluid communication with the lower chamber 243. Fluid pressure may thus be introduced into the upper chamber port 246, and/or fluid pressure may be relieved from the lower chamber port 248, to move the piston 232 to the lower position shown in FIG. 8. Fluid pressure may alternatively be relieved from the upper chamber port 246, and/or fluid pressure may be introduced into the lower chamber port 248, to move the piston 232 to the upper position.

The actuator 230 may be a linear and hydraulic double-acting actuator, as shown. The actuator 230 in particular relies on fluid pressure to move the piston 232 in either direction, as opposed to including a spring or other mechanism for moving the piston 232. A spring return or one way-acting actuator may otherwise depend on moving the piston of the actuator when fluid pressure is no longer applied to the piston or is overcome. A double-acting actuator, on the other hand, may enable more control of the piston 232, and thus, the gate 208 within the gate valve 202.

As will be appreciated, the features described in relation to FIGS. 4-8 may, individually or in combination, be employed together with one or more features described in relation to FIGS. 1-3 to provide advantageous implementations of valve arrangements within the scope of the present disclosure.

Figure 9:
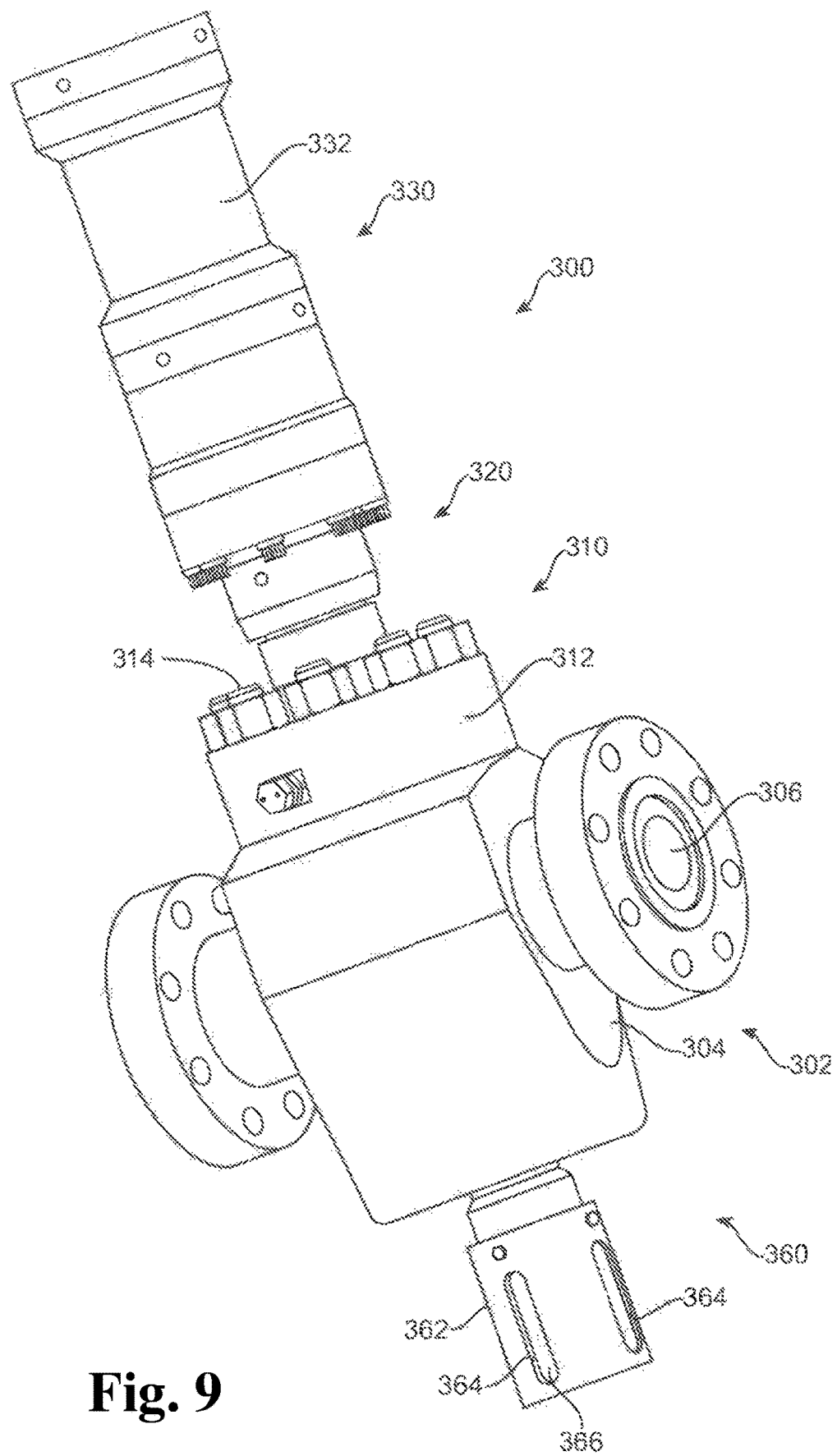
FIG. 9 shows a perspective view of a gate valve assembly in accordance with one or more embodiments of the present disclosure.

Referring now to FIGS. 9-12, a gate valve assembly with a balance stem indicator housing is shown. FIG. 9 shows a perspective view of a gate valve assembly 300 in accordance with one or more embodiments of the present disclosure. The gate valve assembly 300 includes a gate valve 302 with a valve body 304 including a flow bore 306 formed through the valve body 304 for fluid flow. A gate (shown and discussed in greater detail below) is included within and is movable with respect to the valve body 304 to selectively enable or prevent fluid flow through the flow bore 306.

The gate valve assembly 300 includes a bonnet 310 coupled to the gate valve 302. The bonnet 310 includes a bonnet housing 312 coupled to the valve body 304 using one or more fasteners 314 (e.g., bolts or screws) with a valve stem (shown and discussed in greater detail below) positioned within and movable with respect to the bonnet housing 312 along an axis. The valve stem is coupled to the gate to move the gate within the gate valve 302. The bonnet 310 may serve as a cover to the valve body 304, with the bonnet 310 coupled to the valve body 304 once the internal parts to the gate valve 302 are positioned within the valve body 304. To access the internal parts to the gate valve 302, the bonnet 310 may be removed or decoupled from the valve body 304.

The gate valve assembly 300 further includes an actuator 330 to move the gate within the gate valve 302. The actuator 330, which may be any type of actuator, such as a hydraulic, pneumatic, or electric actuator and/or a double-acting actuator, is coupled to the bonnet 310. An actuator housing 332 of the actuator 330 is in particular coupled to the bonnet 310 and/or the valve 302. A connector 320 is included in this embodiment within the gate valve assembly 300 to couple the actuator 330 and the bonnet 310 to each other.

Referring still to FIG. 9, the gate valve assembly 300 includes an indicator housing 360 coupled to the valve 302. The indicator housing 360 may be used to provide a protective barrier to a balance stem (discussed in greater detail below) coupled to the gate of the valve 302, and may further allow for a visual indication of a position of the gate within the valve 302 based upon a position of the balance stem. As shown, the indicator housing 360 includes an indicator body 362 with one or more windows 364. The indicator housing 360 further includes a transparent housing 366 positionable within the indicator body 362 with the transparent housing 366 viewable through the windows 364.

Figure 10:
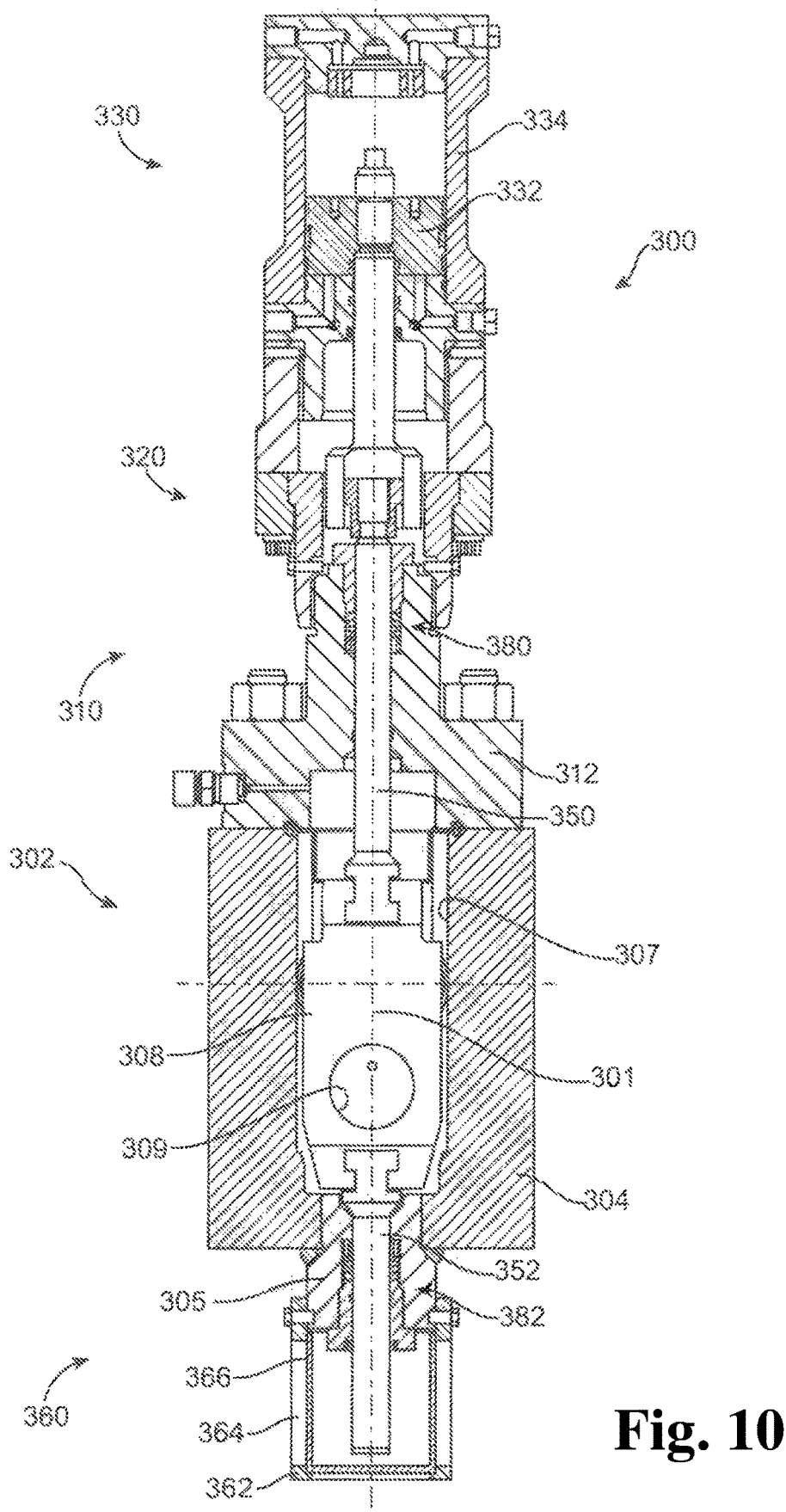
FIG. 10 shows a cross-sectional view of a gate valve assembly in accordance with one or more embodiments of the present disclosure.

Referring now to FIG. 10, a cross-sectional view of the gate valve assembly 300 in accordance with one or more embodiments of the present disclosure is shown. The gate valve assembly 300 includes the gate valve 302, the bonnet 310, the connector 320, the actuator 330, and the indicator housing 360. A gate 308 with a bore 309 formed through the gate 308 is movably positioned within a cavity 307 of the valve body 304. The actuator 330 includes a piston 332 positioned and movable within an actuator housing 334. A valve stem 350 is coupled between the piston 332 and the gate 308 so that the piston 332 of the actuator 330 is able to move the gate 308 within the valve body 304. The gate 308 moves to selectively open and close the gate valve 302. The valve stem 350 thus moves within the gate valve assembly 300 along an axis 301 to move the gate 308.

In addition to the valve stem 350, a balance stem 352 is also coupled to the gate 308 to move with the gate 308 with respect to the valve body 304. The valve stem 350 and/or the balance stem 352 may each be coupled to the gate 308 through a releasable coupling, such as a t-slot coupling as shown. The valve stem 350 and the balance stem 352 are further coupled to opposite ends of the gate 308. The balance stem 352 has the same diameter as the valve stem 350, at least for the portions of the balance stem 352 and the valve stem 350 that are positioned within or movable within the cavity 307. Having the same diameter for the stems 350 and 352 may facilitate balancing the pressure forces across the gate 308 by maintaining a constant volume within the cavity 307. When pressure forces acting on the gate 308 are not balanced, the differential pressure force may otherwise generate an axial force on the gate 308, the valve stem 350, and/or the balance stem 352, which may affect the movement of the gate 308 within the valve 302.

Figure 11:
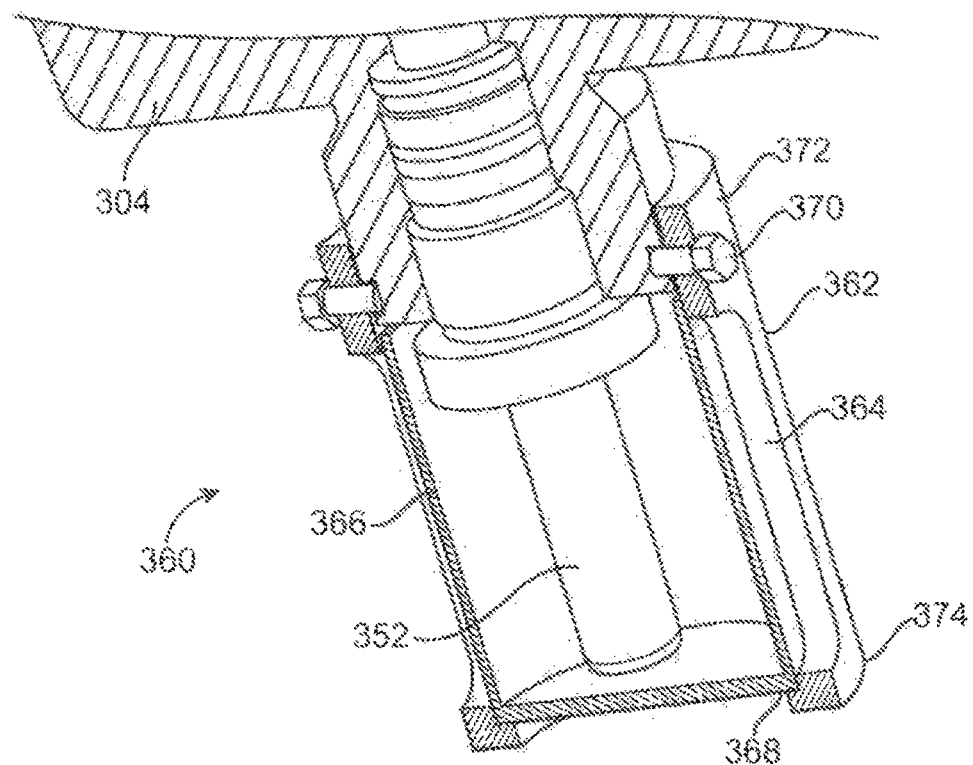
FIG. 11 shows a perspective sectional view of an indicator housing of a gate valve assembly in accordance with one or more embodiments of the present disclosure.

Referring now to FIGS. 10 and 11, the indicator housing 360 is either integral with or coupled to the valve 302 to be positioned over the balance stem 352, at least over the portion of the balance stem 352 extending out of the valve body 304. The indicator body 362 is in particular coupled to the valve body 304 with the transparent housing 366, formed at least partially from a transparent or substantially clear material (e.g., plastic or glass), positioned within the indicator body 362. The indicator body 362 and the transparent housing 366 are thus both positioned over the balance stem 352. The transparent housing 366, along with the indicator body 362 having the windows 364, enable the position of the balance stem 352 to be viewable through the indicator housing 360.

The indicator body 362 may have a cylindrical sleeve shape, as shown, with a groove 368 formed at an inner and lower surface of the indicator body 362. The transparent housing 366 may also have a cylindrical sleeve shape, and even more so a planar end surface to define a cup shape, with an end of the transparent housing 366 received within the groove 368. The indicator housing 360 is further coupled to the valve 302 using one or more fasteners 370. The indicator body 362 may in particular have a valve end 372 and a distal end 374 on opposite sides of the indicator body 362, with the fasteners 370 directly engaging the valve end 372 and the valve body 304 to couple the indicator housing 360 to the valve 302. The fasteners 370 may include a bolt, as shown, or a screw, or a threaded engagement between the indicator body 362 and the valve body 304.

The indicator housing 360 is coupled to the valve 302 to form a non-pressure tight and/or non-fluid tight connection between the indicator body 362, the transparent housing 366, and the valve body 304. For example, by having a non-pressure tight connection between the indicator housing 360 and the valve body 304, the balance stem 352 may be movable within the indicator housing 360 without having reactive pressure force against the balance stem 352, as gas (e.g., air) or fluid in general may be able to flow into and out of the indicator housing 360 as the balance stem 352 moves.

The transparent housing 366 may further be rotatable with respect to the indicator body 362, such as rotatable about the axis 301, when fully assembled, as shown in FIGS. 10 and 11, and/or when disassembled with the indicator body 362 not coupled to the valve body 304. This arrangement enables the transparent housing 366 to be rotated with respect to the windows 366 so that, as the transparent housing 366 may become scratched, worn, damaged, or otherwise less transparent, the transparent housing 366 may be rotated for an undamaged portion to be visible through the windows 366.

Figure 12:
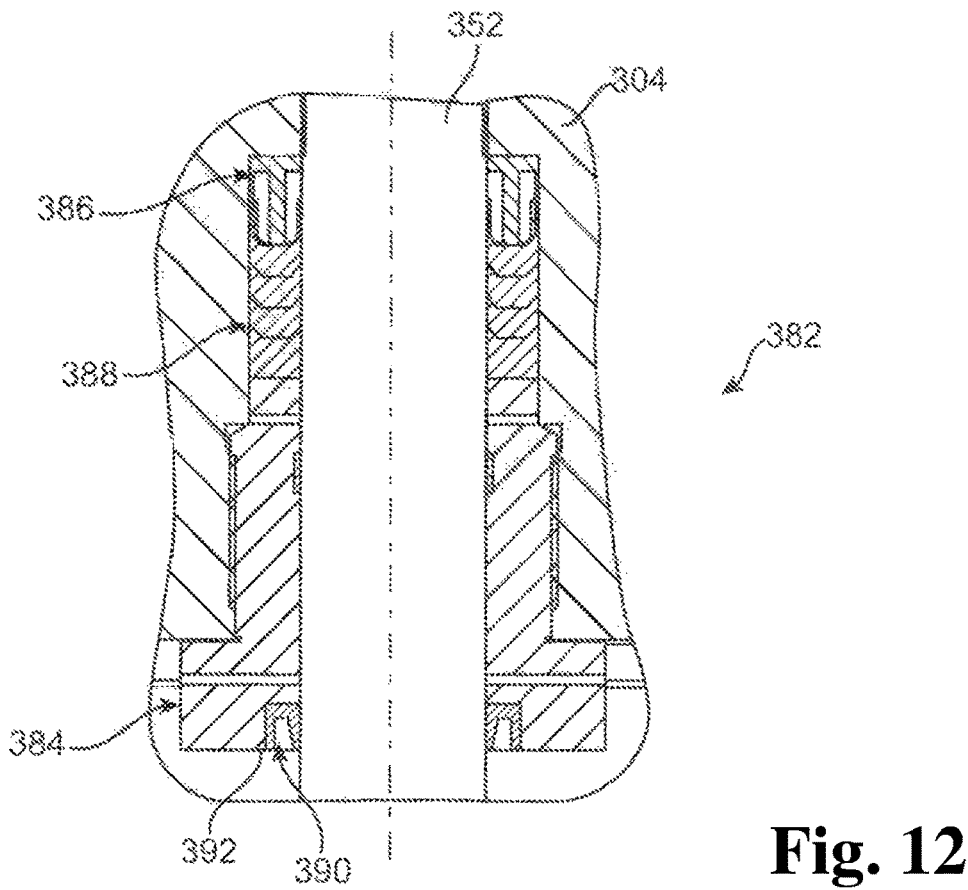
FIG. 12 shows a cross-sectional view of a seal assembly in accordance with one or more embodiments of the present disclosure.

Referring to FIGS. 10-12, stem seal assemblies 380 and 382 are shown in use within the gate valve assembly 300. A valve stem seal assembly 380 is in particular shown positioned between the bonnet housing 312 and the valve stem 350 to form a seal (e.g., dynamic seal) between the valve stem 350 and the bonnet housing 312. A balance stem seal assembly 382 is further positioned between the valve body 304 and the balance stem 352 to form a seal between the balance stem 352 and the valve body 304. Other than the positions of the stem seal assemblies 380 and 382, the stem seal assemblies 380 and 382 are identical and interchangeable with each other. The valve stem seal assembly 380, or any component thereof, may, for example, be interchanged with or used to replace the balance stem seal assembly 382 or any component thereof. This may facilitate manufacturing and maintenance of the stem seal assemblies 380 and 382.

FIG. 12 shows a cross-sectional view of the balance stem seal assembly 382 in accordance with one or more embodiments of the present disclosure. The balance stem seal assembly 382 includes a packing gland 384, a ring 386 (e.g., a T-ring), a stem packing 388, and/or a wiper ring 390. The packing gland 384 threadedly engages the valve body 304 to be positioned about the balance stem 352. The ring 386 is also positioned about the balance stem 352, with the stem packing 388 positioned between the packing gland 384 and the ring 386. The packing gland 384 further includes a groove 392 with the wiper ring 390 positioned, as least partially, within the groove 392 of the packing gland 384 to engage and seal against the balance stem 352.

Referring back to FIG. 10, the valve body 304 may include an additional spacer body portion 305 separate from and fixedly secured to the valve body 304. The spacer body portion 305 is in particular shown as welded to the valve body 304, with the balance stem seal assembly 382 positioned within the spacer body portion 305. Though the present disclosure is not so limited, by having the spacer body portion 305 separate from the valve body 304 and then fixedly secured thereto, this may enable the spacer body portion 305 to be separately manufactured from the valve body 304. This may further facilitate controlling tolerances of manufacturing of the spacer body portion 305, such as for the balance stem seal assembly 382.

As will be appreciated, the features described in relation to FIGS. 9-12 may, individually or in combination, be employed together with one or more features described in relation to FIGS. 1-8 to provide advantageous implementations of valve arrangements within the scope of the present disclosure.

Figure 13:
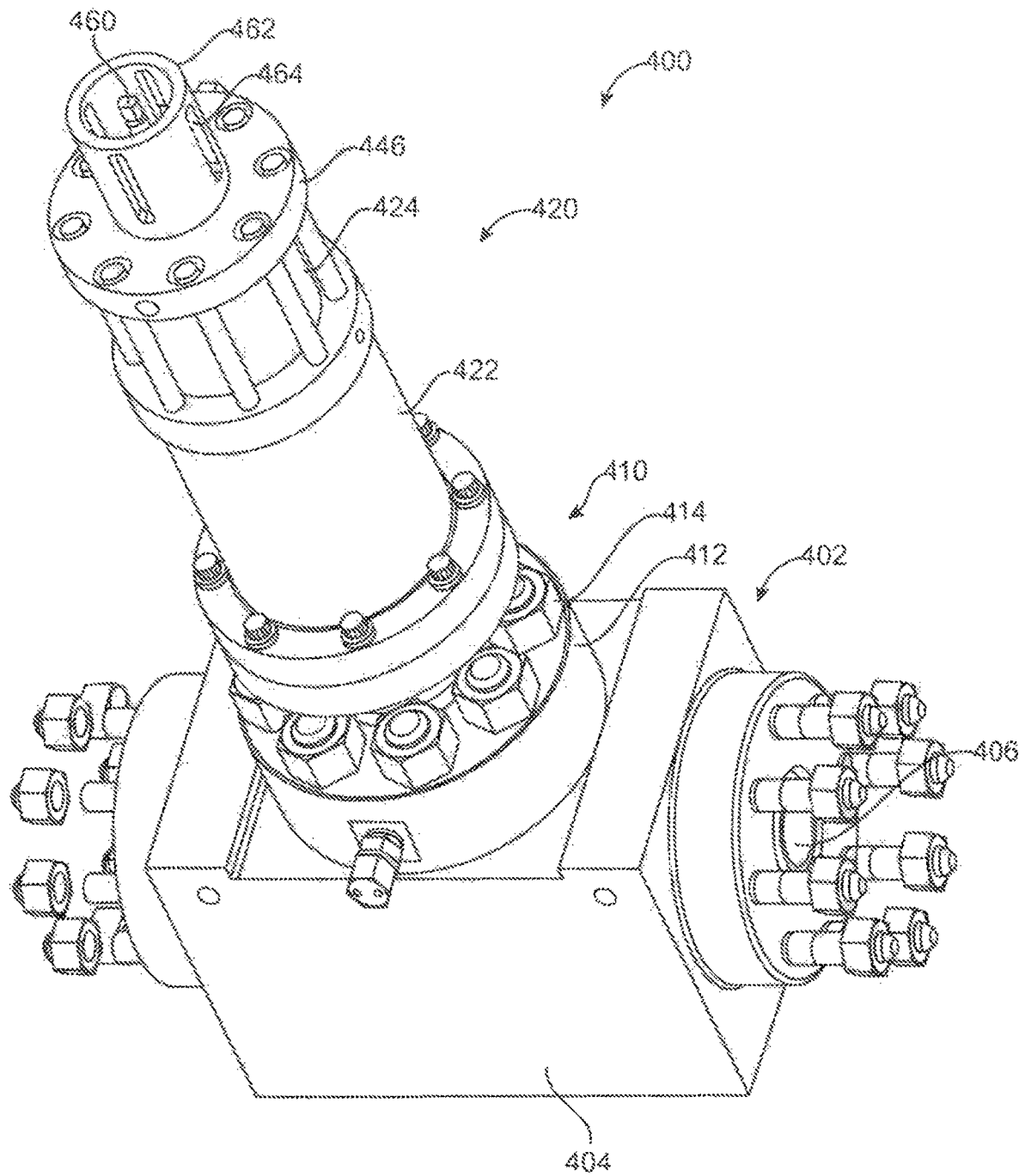
FIG. 13 shows a perspective view of a gate valve assembly in accordance with one or more embodiments of the present disclosure.

Referring now to FIGS. 13-17, a valve having an actuator with removable hydraulic chamber is shown. In FIG. 13, a perspective view of a gate valve assembly 400 in accordance with one or more embodiments of the present disclosure is shown. The gate valve assembly 400 includes a gate valve 402 with a valve body 404 including a flow bore 406 formed through the valve body 404 for fluid flow. A gate (shown and discussed in greater detail below) is included within and movable with respect to the valve body 404 to selectively intersect the flow bore 406 to enable or prevent fluid flow through the flow bore 406.

The gate valve assembly 400 further includes a bonnet 410 coupled to the gate valve 402. The bonnet 410 includes a bonnet housing 412 coupled to the valve body 404 using one or more fasteners 414 (e.g., bolts or screws) with a stem (shown and discussed in greater detail below) positioned within and movable with respect to the bonnet housing 412 along an axis. The stem is coupled to the gate to move the gate within the gate valve 402. The bonnet 410 may serve as a cover to the valve body 404, with the bonnet 410 coupled to the valve body 404 (e.g., semi-permanently) once the internal parts to the gate valve 402 are positioned within the valve body 404. To access the internal parts to the gate valve 402, the bonnet 410 may be removed or decoupled from the valve body 404.

The gate valve assembly 400 further includes an actuator 420, such as a hydraulic actuator and/or a single-acting actuator, that may be coupled to the bonnet 410. As the actuator 420 is a single-acting actuator, the actuator 420 in particular includes a spring, or other type of biasing mechanism, in this embodiment. The actuator 420 includes a spring housing 422 that is separate and distinct from a piston housing 424. The spring housing 422 includes a spring movably positioned therein, and the piston housing 424 includes a piston movably positioned therein. The spring housing 422 is coupled, such as directly coupled, to the bonnet housing 412, with the piston housing 424 coupled, such as directly coupled, to the spring housing 422.

Figure 14:
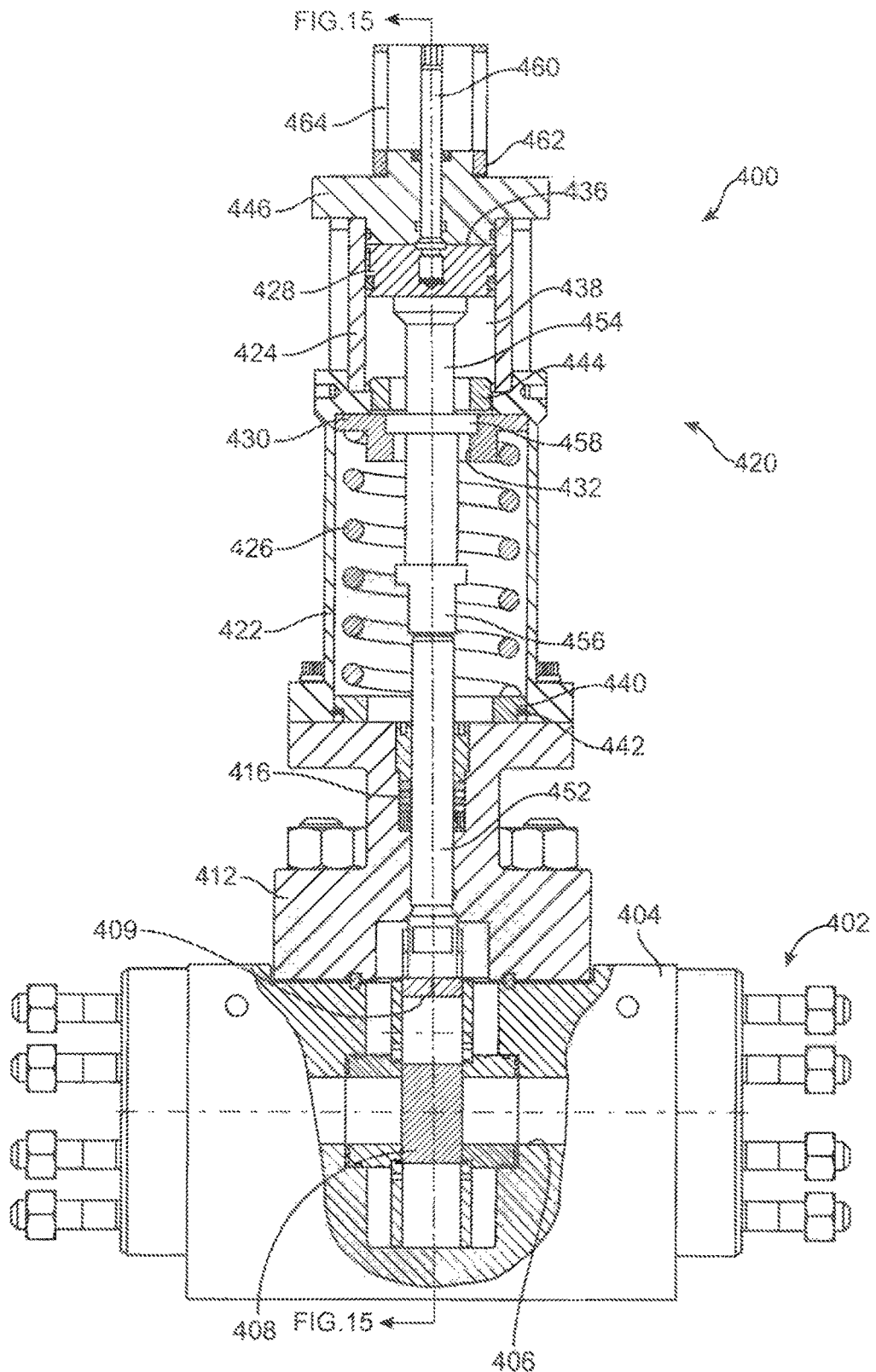
FIG. 14 shows a cross-sectional view of a gate valve assembly in accordance with one or more embodiments of the present disclosure.
Figure 15:
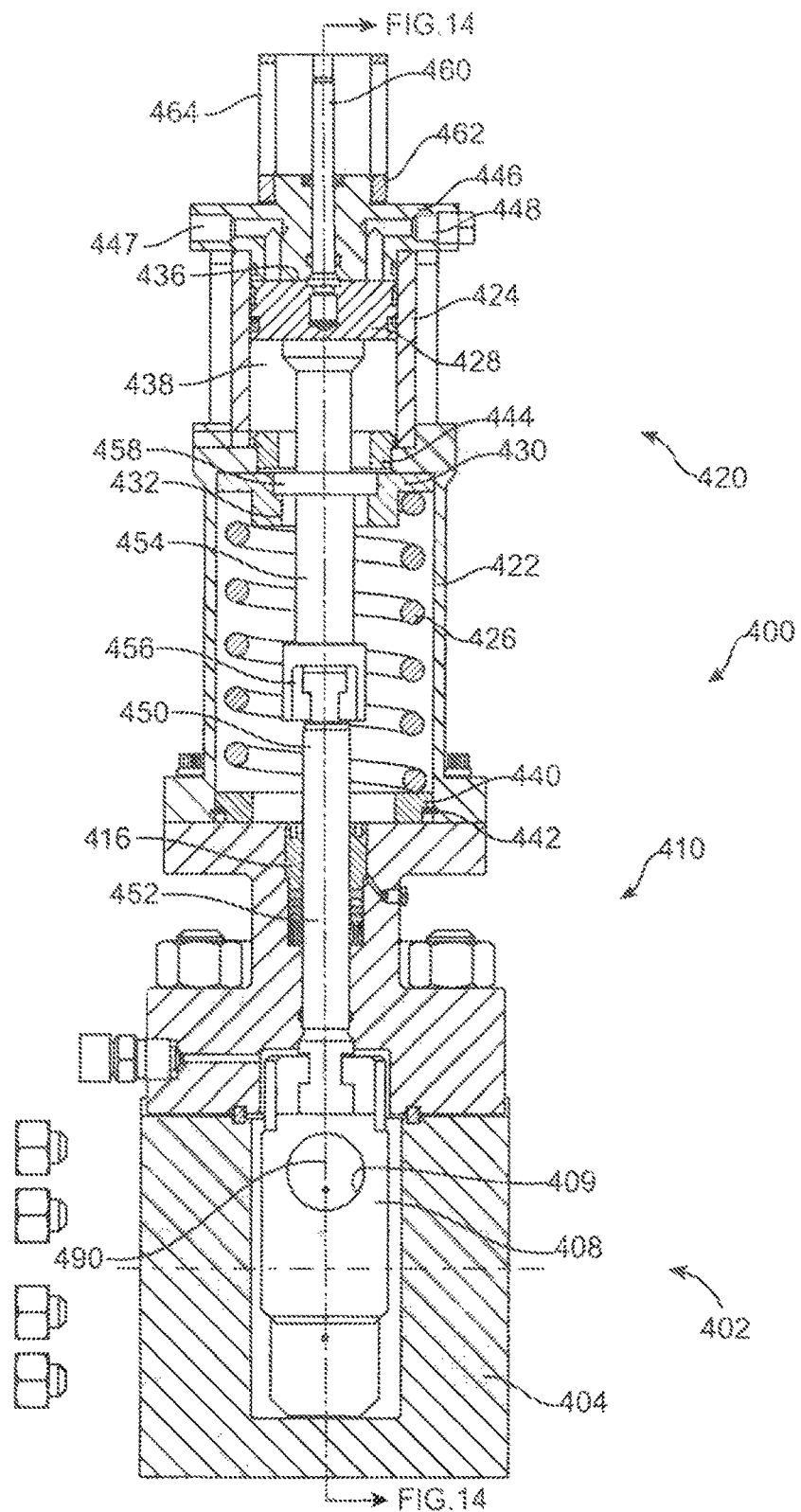
FIG. 15 shows another cross-sectional view of the gate valve assembly from FIG. 14 in accordance with one or more embodiments of the present disclosure.
Figure 16:
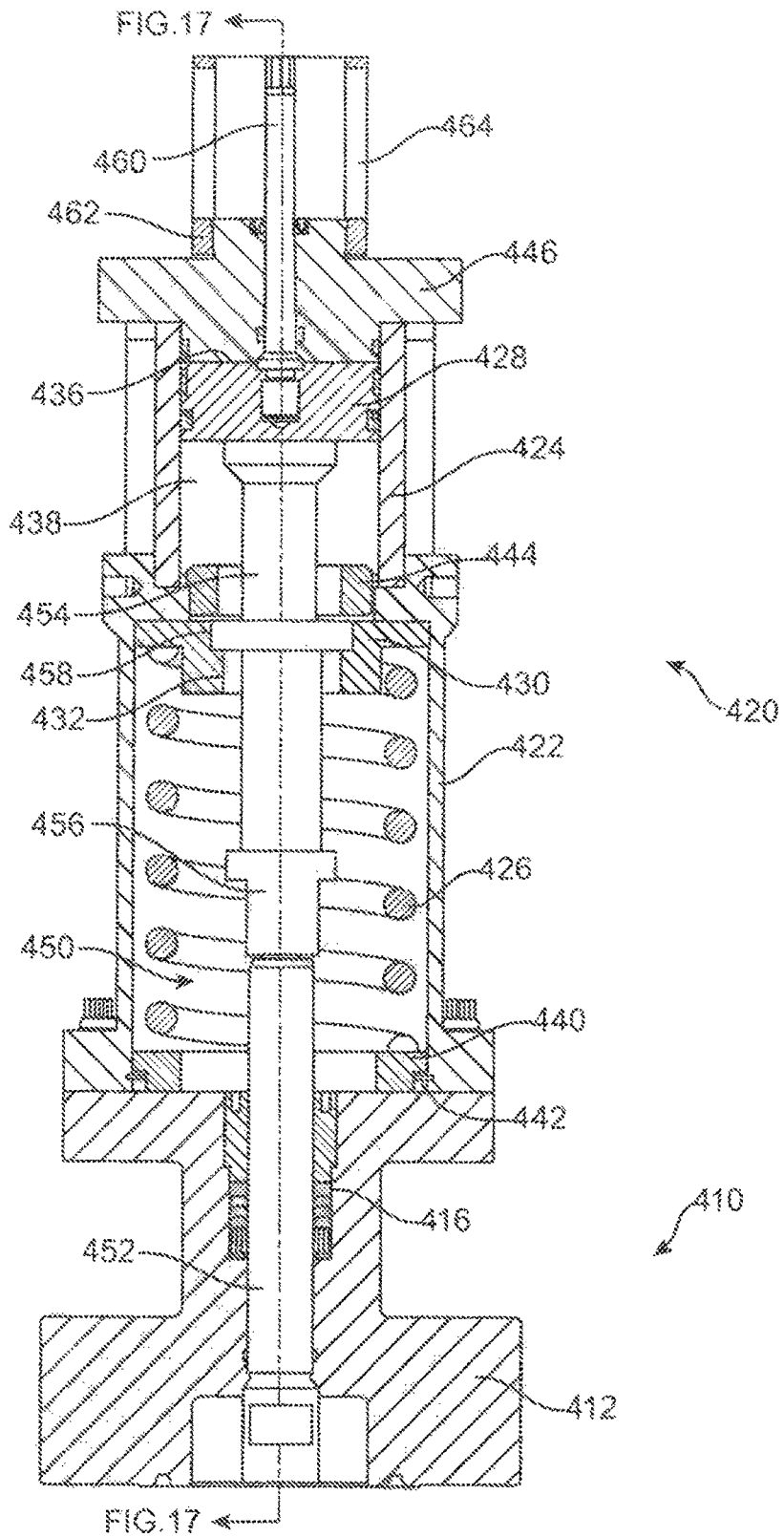
FIG. 16 shows a cross-sectional view of an actuator of a gate valve assembly in accordance with one or more embodiments of the present disclosure.
Figure 17:
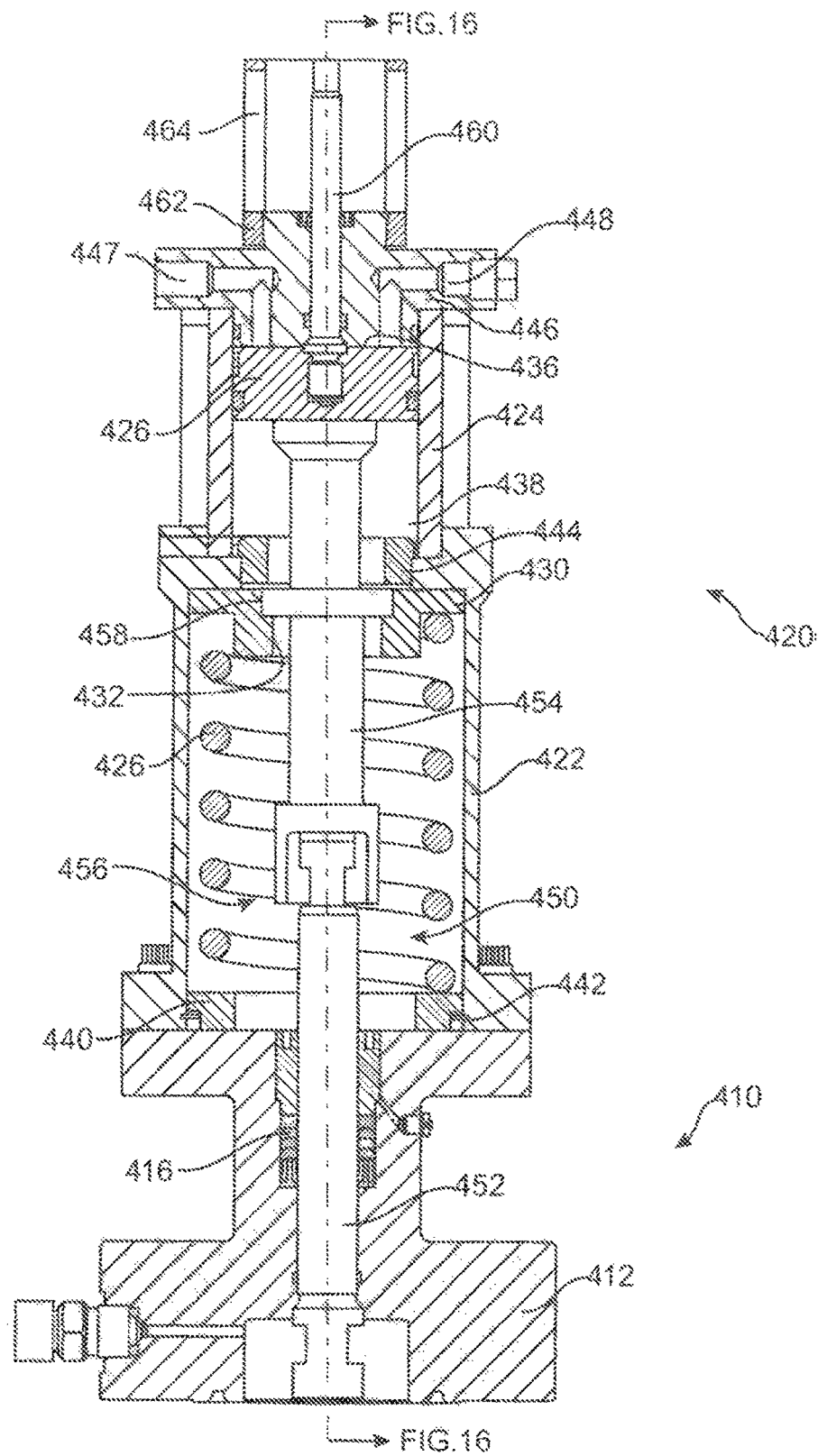
FIG. 17 shows another cross-sectional view of the actuator of the gate valve assembly from FIG. 16 in accordance with one or more embodiments of the present disclosure.

Referring now to FIGS. 14-17, multiple views of the gate valve assembly 400 and the actuator 420 for the gate valve assembly 400 in accordance with one or more embodiments of the present disclosure are shown. In particular, FIGS. 14 and 15 show cross-sectional views of the gate valve assembly 400 taken along different lines with respect to and in reference to each other, and FIGS. 16 and 17 show cross-sectional views of the actuator 420 taken along different lines with respect to and in reference to each other.

The gate valve assembly 400 includes the gate valve 402, the bonnet 410, and the actuator 420. A gate 408 with a bore 409 formed through the gate 408 is movably positioned within the valve body 404. The spring housing 422 includes a spring 426 movably positioned within the spring housing 422, and the piston housing 424 includes a piston 428 movably positioned within the piston housing 424. A stem 450 is coupled between the piston 428 and the gate 408 so that the piston 428 is able to move the gate 408 within the valve body 404 to intersect the flow bore 406 and selectively open and close the gate valve 402. The stem 450 thus moves within the gate valve assembly 400 along an axis 490 to move the gate 408.

The stem 450 may include two or more portions coupled with each other. For example, as shown, the stem 450 includes an operating stem 452 and an actuator stem 454. The operating stem 452 is positioned and movable within the bonnet housing 412 with the operating stem 452 coupled (e.g., directly) to the gate 408. A stem seal assembly 416 is shown positioned about the operating stem 452 within the bonnet housing 412 to effect a seal between the operating stem 452 and the bonnet 410. The operating stem 452 and the actuator stem 454 are coupled to each other through a releasable coupling 456. The releasable coupling 456 may be a non-threaded coupling, which may include a key-and-groove type coupling, such as a t-slot coupling shown in FIG. 14. The coupling between the operating stem 452 and the gate 408 may be similar, such as a releasable non-threaded coupling, shown particularly as a t-slot coupling.

The actuator stem 454 is positioned and movable within the actuator 420, and in particular positioned and movable, at least partially, within the spring housing 422 and the piston housing 424. The actuator stem 454 is used to engage and abut the piston 428, however, the actuator stem 454 is not coupled or connected, directly or indirectly, to the piston 428. The actuator stem 454 is, for example, biased into engagement (e.g., from the spring 426) with the piston 428, in which the actuator stem 454 may be movable with respect to the piston 428. As the piston 428 moves from an upper position to a lower position, the piston 428 applies a force against the actuator stem 454 to also move from an upper position to a lower position. As a biasing force is applied to the actuator stem 454 through the spring 426, the biasing force may be used to move the actuator stem 454 from the lower position to the upper position. As the actuator stem 454 engages the piston 428, though not connected, the actuator stem 454 applies the biasing force against the piston 428 to move the piston 428 from the lower position to the upper position.

To apply the biasing force from the spring 426 to the actuator stem 454, the actuator 420 may include a spring plate 430. The spring plate 430 is positioned and movable within the spring housing 422 with the spring 426 engaging and pushing against the spring plate 430. The actuator stem 454 is positioned or extended through the spring plate 430. The actuator stem 454 in particular includes an outer shoulder 458 that is larger (e.g., in diameter) than an inner shoulder 432 of the spring plate 430. The outer shoulder 458 of the actuator stem 454 engages the inner shoulder 432 of the spring plate 430 to enable the spring 426 to apply the biasing force to the actuator stem 454 through the spring plate 430.

An actuator 420 in accordance with one or more embodiments of the present disclosure may enable the actuator 420 to have any rotational orientation with respect to the bonnet 410 and/or the valve 402. For example, the spring housing 422 and/or the piston housing 422 may have any rotational orientation about the axis 490 with respect to each other, as the actuator stem 454 is not connected or coupled to the piston 428. The spring housing 422 and/or the piston housing 422 may further have any rotational orientation about the axis 490 with respect to the bonnet 410 and/or the valve 402. This may facilitate orientation of ports (discussed more below) of the actuator 420 with respect to the bonnet 410 and/or the valve 402.

As the spring housing 422 and the piston housing 424 of the actuator 420 are separate, the piston 428 is positioned outside of the spring housing 422 so that no piston (i.e., piston 428 or otherwise) is needed or positioned within the spring housing 422. As no piston is included within the spring housing 422, no seals are necessary with the spring housing 422. No seals or seal assemblies are, for example, positioned on the spring housing 422, and no seals or seal assemblies are included with any component included within the spring housing 422. This may facilitate use and maintenance of the spring housing 422. As the spring housing 422 and the piston housing 424 of the actuator 420 are separate, the spring housing 422 and the piston housing 424 may further have different heights. The spring housing 422 in particular has a larger height than that of the piston housing 424. This enables the piston 428 in the piston housing 424 to have a different and shorter travel distance, compared to travel or compression distance of the spring 426 in the spring housing 422, thereby enabling unnecessary fatigue, stress, or deformation to be prevented for the spring 426.

Referring still to FIGS. 14-17, the actuator 420 of the gate valve assembly 400 may include a spring retainer 440. The spring retainer 440 may be used to retain a rotational or axial position of the spring 426 within the spring housing 422. The spring retainer 440 is positionable within the spring housing 422, such as in a lower end of the spring housing 422, with the spring 426 engageable against the spring retainer 440. The spring 426 may engage against a surface of the spring retainer 440, so as to prevent rotation of the spring 426 with respect to the spring retainer 440. The spring retainer 440 may further be used to prevent axial movement of the spring 426 within the spring housing 422, such as by having the spring 426 apply a compressive force against the spring retainer 440 when the spring 426, the spring plate 430, and the spring retainer 440 are positioned within the spring housing 422. A retainer ring 442 may further be used to retain the position of the spring retainer 440 within the spring housing 422. The retainer ring 442 (e.g., a snap ring) is shown as positioned between and engageable with the spring housing 422 and the spring retainer 440 to retain the position of the spring retainer 440 with respect to the spring housing 422.

The piston 428 is positioned and movable within the piston housing 428 to define an upper chamber 436 and a lower chamber 438 within the piston housing 428. The upper chamber 436 is defined between the piston 428 and a piston head 446, and the lower chamber 438 is defined between the piston 428 and the spring housing 422. In one or more embodiments, an adjustment mechanism 444 may further be included with the actuator 420 to adjust the movement of the end positions of the movement of the piston 428 within the actuator 420. For example, the adjustment mechanism 444 is shown as positioned within the lower chamber 438 of the piston housing 424 to be able to adjust the lower position of the piston 428 within the piston housing 424.

In this embodiment, the adjustment mechanism 444 is shown as a drift ring that is directly coupled to the spring housing 422. The adjustment mechanism 444 may be moved relative to the spring housing 422 with respect to the axis 490 to adjust an end stop position for the piston 428 to abut the adjustment mechanism 444. As the adjustment mechanism 444 is a drift ring threadedly engaged with the spring housing 422, the adjustment mechanism 444 may, for example, be rotated with respect to the spring housing 422 to adjust and move the adjustment mechanism 444 axially with respect to the spring housing 422 and adjust the lower position limit of the piston 428 within the piston housing 424 adjacent the spring housing 422.

The piston head 446 is shown as coupled to an upper end of the actuator housing 424. The piston head 446 includes one or more ports to enable fluid communication with the upper chamber 436. The piston head 446 in particular includes an opening port 447 so that fluid pressure may be introduced therethrough into the upper chamber 436, enabling the piston 428 to move from an upper position to a lower position within the piston housing 424. The piston head 446 further includes a closing port 448 so that fluid communication and fluid pressure may be relieved therethrough from the upper chamber 436, enabling the piston 428 to move from the lower position to the upper position within the piston housing 424. With the arrangement shown, hydraulic fluid is only introduced into the upper chamber 436, and not the lower chamber 438, thereby preventing hydraulic fluid from having to be drained from the piston housing 424 if the piston housing 424 is removed from the spring housing 422 (e.g., such as when adjusting adjustment mechanism 444).

Referring still to FIGS. 14-17, an indicator stem 460 may be included with the actuator 420 in accordance with one or more embodiments of the present disclosure. The indicator stem 460 may be used to provide a visual indication of the gate 408 within the gate valve 402. In this embodiment, the indicator stem 460 is coupled to the piston 428 and extends through the piston head 446 to be visible above the piston head 446 exterior to the actuator 420. An indicator stem housing 462 may further also be coupled to the piston head 446 to provide protection to the indicator stem 460. The indicator stem housing 462 may include one or more windows 464 or cutouts formed therein to facilitate visual inspection of the indicator stem 460 within the indicator stem housing 462.

As will be appreciated, the features described in relation to FIGS. 13-17 may, individually or in combination, be employed together with one or more features described in relation to FIGS. 1-12 to provide advantageous implementations of valve arrangements within the scope of the present disclosure.

Various specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. It should moreover be appreciated that such a development effort might be complex and time-consuming, but would nevertheless be a routine undertaking of design, fabrication, and manufacture for those of ordinary skill having the benefit of this disclosure.

In the preceding discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described. As used herein, the terms "axial" and "axially" additionally generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. One skilled in the art will additionally understand that the description has broad application, and the discussion of any embodiment is meant only to be exemplary of that embodiment, and not intended to suggest that the scope of the disclosure, including the claims, is limited to that embodiment. Reference should also be had to the appended claims.

What is claimed is:

1. A gate valve for controlling a flow of a fluid, the gate valve comprising:
   a valve body which comprises a first seat pocket and a flow bore, the flow bore being configured to extend through the valve body for the flow of the fluid;
   a gate which is configured to be movable so as to intersect the flow bore;
   a first seat which comprises a first seat gate end and a first seat body end, the first seat gate end being arranged to face a first side of the gate, and the first seat body end being positionable within the first seat pocket of the valve body;
   a first plate which comprises an opening which is positionable on the first seat at the first seat gate end;
   a first plate retainer which is positionable between the first seat and the first plate, the first plate retainer comprising a wave spring which is only configured to retain the first plate on the first seat by preventing an axial movement between the first seat and the first plate with respect to an axis of the flow bore; and
   a first seat retainer which is positionable between the first seat and the first seat pocket so as to prevent an axial movement between the first seat and the valve body with respect to the axis of the flow bore,
   wherein,
   the first seat further comprises a first groove or the first plate further comprises a groove, and
   the wave spring is positionable within the first groove of the first seat or within the groove of the first plate.

2. The gate valve as recited in claim 1, wherein the first plate retainer is configured to engage with the first seat and with the first plate so as to prevent a rotational movement between the first seat and the first plate about the axis of the flow bore.

3. The gate valve as recited in claim 1, wherein the wave spring does not provide a locking fit.

4. The gate valve as recited in claim 1, wherein the groove of the first plate is formed within the opening of the first plate.

5. The gate valve as recited in claim 1, wherein,
   the first seat further comprises a step on the first seat gate end so that a diameter of the first seat gate end is smaller than a diameter of the first seat body end, and the first plate is positionable within the step.

6. The gate valve as recited in claim 1, wherein the first seat retainer is configured to engage with the first seat and the valve body so as to prevent an axial movement between the first seat and the valve body with respect to the axis of the flow bore.

7. The gate valve as recited in claim 1, wherein,
   the first seat further comprises a second groove or the valve body further comprises a groove, and
   the first seat retainer is positionable within the second groove of the first seat or within the groove of the valve body.

8. The gate valve as recited in claim 1, further comprising:
   a first seal which is positionable between the first seat body end and the first seat pocket of the valve body so as to seal between the first seat and the valve body.

9. The gate valve as recited in claim 8, wherein,
   the first seat further comprises a single piece structure, and
   the first seal comprises an inner diameter first seal and an outer diameter first seal which are configured to seal in opposing directions with respect to each other.

10. The gate valve as recited in claim 9, wherein,
    the valve body further comprises a cavity and a second seat pocket, the second seat pocket being arranged opposing the first seat pocket with respect to the cavity, and
    the gate valve further comprises:
      a second seat which comprises a second seat gate end and a second seat body end, the second seat gate end being arranged to face a second side of the gate and the second seat body end being positionable within the second seat pocket of the valve body, the second side being arranged opposed to the first side with respect to the gate;
      a second plate which comprises an opening which is positionable on the second seat at the second seat gate end; and
      a second plate retainer which is positionable between the second seat and the second plate, the second plate retainer comprising a wave spring which is only configured to retain the second plate on the second seat by preventing an axial movement between the second seat and the second plate with respect to the axis of the flow bore
    wherein,
    the second seat further comprises a groove or the second plate further comprises a groove, and
    the wave spring is arranged within the groove of the second seat or within the groove of the second plate.

11. The gate valve as recited in claim 10, wherein,
    the first plate is positionable over the first seat gate end so that the first plate is fully supported by the first seat within the valve body, and
    the second plate is positionable over the second seat gate end so that the second plate is fully supported by the second seat within the valve body.

12. A gate valve for controlling a flow of a fluid, the gate valve comprising:
    a valve body which comprises a flow bore for the flow of the fluid and a seat pocket;
    a gate which is configured to be movable so as to intersect the flow bore;
    a seat which is positionable within the valve body, the seat comprises a gate end and a body end, the gate end being arranged to face the gate and the body end being positionable within the seat pocket of the valve body;

a plate which is positionable over the seat;

a plate retainer which is positionable between the seat and the plate, the plate retainer comprising a wave spring which is only configured to retain the plate on the seat by preventing an axial movement between the seat and the plate with respect to an axis of the flow bore; and a seat retainer which is positionable between the seat and the seat pocket of the valve body, the seat retainer being configured to engage with the seat and with the seat pocket of the valve body so as to prevent an axial movement between the seat and the valve body with respect to the axis of the flow bore, wherein, the seat further comprises a groove or the plate further comprises a groove, and the wave spring is arranged within the groove of the seat or within the groove of the plate.

13. The gate valve as recited in claim 12, wherein the plate retainer is further configured to engage with the seat and with the plate so as to prevent a rotational movement between the seat and the plate about the axis of the flow bore.

14. The gate valve as recited in claim 12, wherein the plate retainer is further configured to be positionable between the seat and the plate.

15. The gate valve as recited in claim 14, wherein the wave spring does not provide a locking fit.

16. The gate valve as recited in claim 12, wherein the plate comprises an opening which is positionable on the seat at the gate end.

17. A gate valve for controlling a flow of a fluid, the gate valve comprising:

a valve body which comprises a seat pocket and a flow bore, the flow bore being configured to extend through the valve body for the flow of the fluid;

a gate which is configured to be movable so as to intersect the flow bore;

a seat which comprises a seat gate end and a seat body end, the seat gate end being arranged to face a side of the gate, and the seat body end being positionable within the seat pocket of the valve body;

a plate which comprises an opening which is positionable on the seat at the seat gate end;

a plate retainer which is positionable between the seat and the plate so as to prevent an axial movement between the seat and the plate with respect to an axis of the flow bore, the plate retainer comprising a first wave spring; and a seat retainer which is positionable between the seat and the seat pocket so as to prevent an axial movement between the first seat and the valve body with respect to the axis of the flow bore, the seat retainer comprising a second wave spring, wherein, the seat further comprises a first groove or the plate further comprises a groove, and the first wave spring is arranged within the first groove of the seat or within the groove of the plate, the seat further comprises a second groove or the valve body further comprises a groove, and the second wave spring is arranged within the second groove of the seat or within the groove of the valve body, and neither the first wave spring nor the second wave spring provides a sealing effect.

\* \* \* \* \*